United States Patent
Stockwell

(10) Patent No.: US 11,836,320 B2
(45) Date of Patent: Dec. 5, 2023

(54) SPURIOUS HAND SIGNAL REJECTION DURING STYLUS USE

(71) Applicant: Google LLC, Mountain View, CA (US)

(72) Inventor: Douglas James Stockwell, Sydney (AU)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/870,231

(22) Filed: Jul. 21, 2022

(65) Prior Publication Data
US 2023/0195263 A1  Jun. 22, 2023

Related U.S. Application Data

(60) Provisional application No. 63/290,937, filed on Dec. 17, 2021.

(51) Int. Cl.
| | |
|---|---|
| *G06F 3/038* | (2013.01) |
| *G06F 3/041* | (2006.01) |
| *G06F 3/044* | (2006.01) |
| *G06F 3/0354* | (2013.01) |
| *G06F 3/0346* | (2013.01) |

(52) U.S. Cl.
CPC ........ *G06F 3/04186* (2019.05); *G06F 3/0346* (2013.01); *G06F 3/0383* (2013.01); *G06F 3/03546* (2013.01); *G06F 3/0441* (2019.05); *G06F 3/0442* (2019.05)

(58) Field of Classification Search
CPC ............... G06F 3/04186; G06F 3/0346; G06F 3/03546; G06F 3/0383; G06F 3/0441; G06F 3/0442
See application file for complete search history.

(56) References Cited

U.S. PATENT DOCUMENTS

2006/0109252 A1   5/2006  Kolmykov-Zotov et al.
2013/0300672 A1*  11/2013  Griffin ................ G06F 3/04883
                                                      345/173
(Continued)

OTHER PUBLICATIONS

An, Jae-Sung, et al., Jae-Sung An et al., "Multi-way interactive capacitive touch system with palm rejection of active stylus for 86" touch screen panels," 2018 IEEE International Solid—State Circuits Conference—(ISSCC), 2018, pp. 182-184, doi: 10.1109/ISSCC.2018.8310244.

(Continued)

*Primary Examiner* — Jonathan A Boyd
(74) *Attorney, Agent, or Firm* — Botos Churchill IP Law

(57) ABSTRACT

Systems and methods for identifying spurious signals in capacitive touch sensors. In some examples, the technology may include a capacitive touch sensor having an input surface, a stylus configured to transmit a first electrical signal through its exterior surface based on a determination of an orientation of the stylus, and one or more processors configured to: identify a contact to a first area of the input surface based on one or more changes in electrical charge sensed in the first area, determine that the one or more changes in electrical charge sensed in the first area include the first electrical signal, and determine whether to identify the contact to the first area as spurious based on the determination that the one or more changes in electrical charge sensed in the first area include the first electrical signal.

20 Claims, 20 Drawing Sheets

(56) References Cited

U.S. PATENT DOCUMENTS

| | | | |
|---|---|---|---|
| 2016/0124528 A1* | 5/2016 | Feng | G06F 3/03545 |
| | | | 345/179 |
| 2019/0187810 A1* | 6/2019 | Alack, Jr. | G06F 3/0442 |
| 2021/0286450 A1* | 9/2021 | Han | G06F 3/0383 |
| 2021/0303087 A1* | 9/2021 | Vanka | G06F 3/0487 |

OTHER PUBLICATIONS

Hinckley, et al., Ken Hinckley, et al., "Sensing techniques for tablet+stylus interaction," In Proceedings of the 27th annual ACM symposium on User interface software and technology (UIST '14). Association for Computing Machinery, New York, NY, USA, pp. 605-614. 2014.

Vu, et al., T. Vu et al., "Capacitive Touch Communication: A Technique to Input Data through Devices' Touch Screen," in IEEE Transactions on Mobile Computing, vol. 13, No. 1, pp. 4-19, Jan. 2014.

\* cited by examiner

1102

Transmit a first electrical signal through an exterior surface of a body of a stylus

1104

Identify a contact to a first area of an input surface of a capacitive touch sensor based on one or more changes in electrical charge sensed in the first area

1106

Determine that the one or more changes in electrical charge sensed in the first area include the first electrical signal

1108

Determine whether to identify the contact to the first area as spurious based at least in part on the determination that the one or more changes in electrical charge sensed in the first area include the first electrical signal

SPURIOUS HAND SIGNAL REJECTION DURING STYLUS USE

CROSS-REFERENCE TO RELATED APPLICATIONS

This application claims the benefit of the filing date of U.S. Provisional Application No. 63/290,937, filed Dec. 17, 2021, the entire disclosure of which is hereby incorporated by reference herein.

BACKGROUND

Capacitive touch sensors (e.g., trackpads, touch screens) may be incorporated into a wide variety of different electronic devices such as personal computers, tablets, mobile phones, monitors, televisions, smart boards, wearable devices such as smart watches, etc. Capacitive touch sensors may be configured to sense contact from any object that produces a change in electrical charge when contacting the input surface of the capacitive touch sensor, such as a user's hand, a passive stylus configured conduct a charge to or from a user's hand to the input surface, an active stylus configured to transmit an electrical signal to the input surface, etc. In some instances, it may thus be desirable for a device to be configured to differentiate between a contact from a stylus and a contact from a user's hand.

BRIEF SUMMARY

The present technology concerns systems and methods for the technical problem involving identifying spurious signals in capacitive touch sensors. For example, in some instances, a user intending to make inputs with a stylus (e.g., tapping or writing with the tip of the stylus) may rest a portion of their hand on the input surface of the capacitive touch sensor. In such a case, it may be desirable for the electronic device to be configured to identify the contact from the user's hand as being spurious, and thus only register contacts from the stylus as intended inputs. However, in other instances, a user may intend to make inputs with their hand (e.g., pointing, swiping, pinching with a thumb and finger) while also holding a stylus in the same hand. In such a case, it may be desirable for the electronic device to be configured to identify the one or more contacts from the user's hand as not being spurious, and thus register those one or more contacts as intended inputs. For example, a technical solution for an application running on the electronic device may be configuring it to reject or ignore contacts identified as spurious, such that they are not used to control one or more operations (e.g., selecting soft-buttons, activating fields, entering text into a particular field, etc.).

The present technology may thus employ a stylus configured to transmit a first electrical signal through at least a portion of its exterior surface and into the hand of a user such that the first electrical signal may be sensed by the capacitive touch sensor when the user's hand contacts the input surface of the capacitive touch sensor, and one or more processors configured to determine that changes in electrical charge sensed in a first area of the input surface include the first electrical signal. In some aspects, the stylus may be configured to only transmit the first electrical signal when it is held in certain orientations (e.g., when it is held with its tip oriented toward the input surface of the capacitive touch sensor), and the one or more processors may be configured to determine whether to identify the contact to the first area as being spurious based on a determination that changes in electrical charge sensed in the first area include the first electrical signal. Further, in some aspects, the stylus may be configured to transmit the first electrical signal regardless of how it is oriented, and the one or more processors may be configured to determine whether to identify the contact to the first area as being spurious based on one or more of: a determination that changes in electrical charge sensed in the first area include the first electrical signal; a determination of how the stylus was oriented at the time of the contact to the first area; a determination of how the input surface was oriented at the time of the contact to the first area; and/or a determination of whether the tip of the stylus was also in contact with a portion of the input surface at the time of the contact to the first area.

In one aspect, the disclosure describes a system comprising: (1) a capacitive touch sensor having an input surface; (2) a stylus having a tip at a first end, a body extending from the tip to a second end, and a longitudinal axis extending from the first end to the second end, the stylus being configured to transmit a first electrical signal through an exterior surface of the body based at least in part on a determination of an orientation of the stylus; (3) a memory; and (4) one or more processors coupled to the memory and configured to: identify a contact to a first area of the input surface based on one or more changes in electrical charge sensed in the first area; determine that the one or more changes in electrical charge sensed in the first area include the first electrical signal; and determine whether to identify the contact to the first area as spurious based at least in part on the determination that the one or more changes in electrical charge sensed in the first area include the first electrical signal. In some aspects, the capacitive touch sensor is part of a capacitive touch screen. In some aspects, the one or more processors are further configured to determine that the one or more changes in electrical charge sensed in the first area include the first electrical signal based at least in part on a frequency of the changes in electrical charge. In some aspects, the one or more processors are further configured to determine that the one or more changes in electrical charge sensed in the first area include the first electrical signal based at least in part on a phase of the changes in electrical charge. In some aspects, the one or more processors are further configured to determine that the one or more changes in electrical charge sensed in the first area include the first electrical signal based at least in part on an amplitude of the changes in electrical charge. In some aspects, the stylus is further configured to transmit the first electrical signal through an exterior surface of the body based on a determination that the tip of the stylus is pointing toward the input surface of the capacitive touch sensor. In some aspects, the stylus is further configured not to transmit the first electrical signal through an exterior surface of the body based on a determination that the stylus is oriented with the longitudinal axis substantially parallel to the input surface. In some aspects, the stylus is further configured not to transmit the first electrical signal through an exterior surface of the body based on a determination that the stylus is oriented with the tip pointing away from the input surface. In some aspects, the stylus is further configured to transmit a second electrical signal through an exterior surface of the tip. In some aspects, the one or more processors are further configured to: identify a contact to a second area of the input surface based on one or more changes in electrical charge sensed in the second area; and determine that the one or more changes in electrical charge sensed in the second area include the second electrical signal. In some aspects, the stylus further includes a tilt sensor, and the stylus is further configured to determine an orientation of the stylus based at least in part on an output of the tilt sensor. In some aspects, the stylus further includes a gyro sensor, and the stylus is further configured to determine an orientation of the stylus based at least in part on an output of the gyro sensor. In some aspects, the stylus further includes one or more accelerometers, and the stylus is further configured to determine an orientation of the stylus based at least in part on an output of at least one of the one or more accelerometers. In some aspects, the stylus further includes a camera configured to record image or video data, and the stylus is further configured to determine an orientation of the stylus based at least in part on an output of the camera.

In another aspect, the disclosure describes a stylus for use with a capacitive touch sensor, comprising: a tip at a first end; a body extending from the tip to a second end; and a longitudinal axis extending from the first end to the second end, wherein the stylus is configured to transmit a first electrical signal through an exterior surface of the body based at least in part on a determination of an orientation of the stylus. In some aspects, the stylus is further configured to transmit a second electrical signal through an exterior surface of the tip. In some aspects, the stylus further includes a tilt sensor, and the stylus is further configured to determine an orientation of the stylus based at least in part on an output of the tilt sensor. In some aspects, the stylus further includes a gyro sensor, and the stylus is further configured to determine an orientation of the stylus based at least in part on an output of the gyro sensor. In some aspects, the stylus further includes one or more accelerometers, and the stylus is further configured to determine an orientation of the stylus based at least in part on an output of at least one of the one or more accelerometers. In some aspects, the stylus further includes a camera configured to record image or video data, and the stylus is further configured to determine an orientation of the stylus based at least in part on an output of the camera.

In another aspect, the disclosure describes a system comprising: (1) a capacitive touch sensor having an input surface; (2) a stylus having a tip at a first end, a body extending from the tip to a second end, and a longitudinal axis extending from the first end to the second end, the stylus being, configured to transmit a first electrical signal through an exterior surface of the body; (3) a memory; and (4) one or more processors coupled to the memory and configured to: identify a contact to a first area of the input surface based on one or more changes in electrical charge sensed in the first area; determine that the one or more changes in electrical charge sensed in the first area include the first electrical signal; determine an orientation of the stylus at a time of the contact to the first area; and determine whether to identify the contact to the first area as spurious based at least in part on the determined orientation of the stylus at the time of the contact to the first area. In some aspects, the capacitive touch sensor is part of a capacitive touch screen. In some aspects, the one or more processors are further configured to determine that the one or more changes in electrical charge sensed in the first area include the first electrical signal based at least in part on a frequency of the changes in electrical charge. In some aspects, the one or more processors are further configured to determine that the one or more changes in electrical charge sensed in the first area include the first electrical signal based at least in part on a phase of the changes in electrical charge. In some aspects, the one or more processors are further configured to determine that the one or more changes in electrical charge sensed in the first area include the first electrical signal based at least in part on an amplitude of the changes in electrical charge. In some aspects, the one or more processors are further configured to identify the contact to the first area as spurious based on a determination that, at the time of the contact to the first area, the tip of the stylus was pointing toward the input surface of the capacitive touch sensor. In some aspects, the one or more processors are further configured to identify the contact to the first area as not spurious based on a determination that, at the time of the contact to the first area, the stylus was oriented with the longitudinal axis substantially parallel to the input surface. In some aspects, the one or more processors are further configured to identify the contact to the first area as not spurious based on a determination that, at the time of the contact to the first area, the stylus was oriented with the tip pointing away from the input surface. In some aspects, the one or more processors are further configured to identify the contact to the first area as not spurious based on a determination that, at the time of the contact to the first area, the stylus was oriented with the tip pointing toward the input surface but without the tip being in contact with the input surface. In some aspects, the one or more processors are further configured to identify the contact to the first area as spurious based on a determination that, at the time of the contact to the first area, the stylus was oriented with the tip being in contact with the input surface. In some aspects, the stylus is further configured to transmit a second electrical signal through an exterior surface of the tip. In some aspects, the one or more processors are further configured to: identify a contact to a second area of the input surface based on one or more changes in electrical charge sensed in the second area; and determine that the one or more changes in electrical charge sensed in the second area include the second electrical signal. In some aspects, the one or more processors are further configured to identify the contact to the first area as spurious based on a determination that, at the time of the contact to the first area, the stylus was oriented with the tip being in contact with the input surface. In some aspects, the one or more processors are further configured to determine that, at the time of the contact to the first area, the stylus was oriented with the tip being in contact with the input surface based on the determination that the one or more changes in electrical charge sensed in the second area include the second electrical signal. In some aspects, the time of the contact to the first area is a period of time, and the one or more processors are further configured to identify the contact to the first area as spurious based on a determination that the stylus was oriented with the tip being in contact with the input surface during at least a portion of the period of time. In some aspects, the one or more processors are further configured to identify the contact to the first area as spurious based on a determination that the tip of the stylus was never out of contact with the input surface for more than a predetermined threshold duration during the period of time. In some aspects, the stylus further includes a tilt sensor, and the one or more processors are further configured to determine the orientation of the stylus at the time of the contact to the first area based at least in part on an output of the tilt sensor. In some aspects, the stylus further includes a gyro sensor, and the one or more processors are further configured to determine the orientation of the stylus at the time of the contact to the first area based at least in part on an output of the gyro sensor. In some aspects, the stylus further includes one or more accelerometers, and the one or more processors are further configured to determine the orientation of the stylus at the time of the contact to the first area based at least in part on an output of at least one of the one or more accelerometers. In some aspects, the system further comprises a camera configured to record image or video data of the stylus, and the one or more processors are further configured to determine the orientation of the stylus at the time of the contact to the first area based at least in part on an output of the camera. In some aspects, the one or more processors are further configured to determine whether to identify the contact to the first area as spurious based at least in part on the orientation of the stylus relative to the input surface at the time of the contact to the first area. In some aspects, the system further comprises a housing containing the capacitive touch sensor, the housing having one or more tilt sensors, gyro sensors, or accelerometers; and the one or more processors are further configured to determine the orientation of the stylus relative to the input surface at the time of the contact to the first area based at least in part on an output of the one or more tilt sensors, gyro sensors, or accelerometers.

In another aspect, the disclosure describes a system, comprising: a capacitive touch sensor having an input surface; a memory; and one or more processors coupled to the memory and configured to: identify a contact to a first area of the input surface based on one or more changes in electrical charge sensed in the first area; determine that the one or more changes in electrical charge sensed in the first area include a first electrical signal; determine an orientation of a stylus at a time of the contact to the first area; and determine whether to identify the contact to the first area as spurious based at least in part on the determined orientation of the stylus at the time of the contact to the first area. In some aspects, the capacitive touch sensor is part of a capacitive touch screen. In some aspects, the one or more processors are further configured to determine that the one or more changes in electrical charge sensed in the first area include the first electrical signal based at least in part on a frequency of the changes in electrical charge. In some aspects, the one or more processors are further configured to determine that the one or more changes in electrical charge sensed in the first area include the first electrical signal based at least in part on a phase of the changes in electrical charge. In some aspects, the one or more processors are further configured to determine that the one or more changes in electrical charge sensed in the first area include the first electrical signal based at least in part on an amplitude of the changes in electrical charge. In some aspects, the one or more processors are further configured to identify the contact to the first area as spurious based on a determination that, at the time of the contact to the first area, a tip of the stylus was pointing toward the input surface of the capacitive touch sensor. In some aspects, the one or more processors are further configured to identify the contact to the first area as not spurious based on a determination that, at the time of the contact to the first area, the stylus was oriented with a longitudinal axis of the stylus being substantially parallel to the input surface. In some aspects, the one or more processors are further configured to identify the contact to the first area as not spurious based on a determination that, at the time of the contact to the first area, the stylus was oriented with a tip of the stylus pointing away from the input surface. In some aspects, the one or more processors are further configured to identify the contact to the first area as not spurious based on a determination that, at the time of the contact to the first area, the stylus was oriented with a tip of the stylus pointing toward the input surface but without the tip being in contact with the input surface. In some aspects, the one or more processors are further configured to identify the contact to the first area as spurious based on a determination that, at the time of the contact to the first area, the stylus was oriented with a tip of the stylus being in contact with the input surface. In some aspects, the one or more processors are further configured to: identify a contact to a second area of the input surface based on one or more changes in electrical charge sensed in the second area; and determine that the one or more changes in electrical charge sensed in the second area include a second electrical signal. In some aspects, the one or more processors are further configured to identify the contact to the first area as spurious based on a determination that, at the time of the contact to the first area, the stylus was oriented with a tip of the stylus being in contact with the input surface. In some aspects, the one or more processors are further configured to determine that, at the time of the contact to the first area, the stylus was oriented with the tip of the stylus being in contact with the input surface based on the determination that the one or more changes in electrical charge sensed in the second area include the second electrical signal. In some aspects, the time of the contact to the first area is a period of time, and the one or more processors are further configured to identify the contact to the first area as spurious based on a determination that the stylus was oriented with the tip being in contact with the input surface during at least a portion of the period of time. In some aspects, the one or more processors are further configured to identify the contact to the first area as spurious based on a determination that the tip of the stylus was never out of contact with the input surface for more than a predetermined threshold duration during the period of time. In some aspects, the system further comprises a camera configured to record image or video data of the stylus, and the one or more processors are further configured to determine the orientation of the stylus at the time of the contact to the first area based at least in part on an output of the camera. In some aspects, the one or more processors are further configured to determine whether to identify the contact to the first area as spurious based at least in part on the orientation of the stylus relative to the input surface at the time of the contact to the first area. In some aspects, the system further comprises a housing containing the capacitive touch sensor, the housing having one or more tilt sensors, gyro sensors, or accelerometers, and the one or more processors are further configured to determine the orientation of the stylus relative to the input surface at the time of the contact to the first area based at least in part on an output of the one or more tilt sensors, gyro sensors, or accelerometers.

In another aspect, the disclosure describes a computer-implemented method, comprising: determining, using one or more processors of a processing system, an orientation of a stylus, the stylus having a tip at a first end, a body extending from the tip to a second end, and a longitudinal axis extending from the first end to the second end; transmitting a first electrical signal through an exterior surface of a body of the stylus based on the determined orientation of the stylus; identifying, using the one or more processors, a contact to a first area of an input surface of a capacitive touch sensor based on one or more changes in electrical charge sensed in the first area; determining, using the one or more processors, that the one or more changes in electrical charge sensed in the first area include the first electrical signal; and determining using the one or more processors, whether to identify the contact to the first area as spurious based at least in part on the determination that the one or more changes in electrical charge sensed in the first area include the first electrical signal. In some aspects, determining that the one or more changes in electrical charge sensed in the first area include the first electrical signal is based at least in part on a frequency of the changes in electrical charge. In some aspects, determining that the one or more changes in electrical charge sensed in the first area include the first electrical signal is based at least in part on a phase of the changes in electrical charge. In some aspects, determining that the one or more changes in electrical charge sensed in the first area include the first electrical signal is based at least in part on an amplitude of the changes in electrical charge. In some aspects, transmitting a first electrical signal through an exterior surface of a body of the stylus based on the determined orientation of the stylus comprises transmitting the first electrical signal through an exterior surface of the body based on a determination that the tip of the stylus is pointing toward the input surface of the capacitive touch sensor. In some aspects, transmitting a first electrical signal through an exterior surface of a body of the stylus based on the determined orientation of the stylus comprises not transmitting the first electrical signal through an exterior surface of the body based on a determination that the stylus is oriented with the longitudinal axis substantially parallel to the input surface. In some aspects, transmitting a first electrical signal through an exterior surface of a body of the stylus based on the determined orientation of the stylus comprises not transmitting the first electrical signal through an exterior surface of the body based on a determination that the stylus is oriented with the tip pointing away from the input surface. In some aspects, the method further comprises transmitting a second electrical signal through an exterior surface of the tip. In some aspects, the method further comprises: identifying, using the one or more processors, a contact to a second area of the input surface based on one or more changes in electrical charge sensed in the second area; and determining using the one or more processors, that the one or more changes in electrical charge sensed in the second area include the second electrical signal. In some aspects, determining the orientation of the stylus is based at least in part on an output of a tilt sensor included in the stylus. In some aspects, determining the orientation of the stylus is based at least in part on an output of a gyro sensor included in the stylus. In some aspects, determining the orientation of the stylus is based at least in part on an output of one or more accelerometers included in the stylus. In some aspects, determining the orientation of the stylus is based at least in part on an output of a camera included in the stylus and configured to record image or video data.

In another aspect, the disclosure describes a computer-implemented method, comprising: transmitting a first electrical signal through an exterior surface of a body of a stylus, the stylus having a tip at a first end, the body extending from the tip to a second end, and a longitudinal axis extending from the first end to the second end; identifying, using one or more processors of a processing system, a contact to a first area of an input surface of a capacitive touch sensor based on one or more changes in electrical charge sensed in the first area; determining, using the one or more processors, that the one or more changes in electrical charge sensed in the first area include the first electrical signal; determining, using one or more processors of a processing system, an orientation of a stylus at a time of the contact to the first area; and determining, using the one or more processors, whether to identify the contact to the first area as spurious based at least in part on the determined orientation of the stylus at the time of the contact to the first area. In some aspects, determining that the one or more changes in electrical charge sensed in the first area include the first electrical signal is based at least in part on a frequency of the changes in electrical charge. In some aspects, determining that the one or more changes in electrical charge sensed in the first area include the first electrical signal is based at least in part on a phase of the changes in electrical charge. In some aspects, determining that the one or more changes in electrical charge sensed in the first area include the first electrical signal is based at least in part on an amplitude of the changes in electrical charge. In some aspects, determining whether to identify the contact to the first area as spurious based at least in part on the determined orientation of the stylus at the time of the contact to the first area comprises: identifying the contact to the first area as spurious based on a determination that, at the time of the contact to the first area, the tip of the stylus was pointing toward the input surface of the capacitive touch sensor. In some aspects, determining whether to identify the contact to the first area as spurious based at least in part on the determined orientation of the stylus at the time of the contact to the first area comprises: identifying the contact to the first area as not spurious based on a determination that, at the time of the contact to the first area, the stylus was oriented with the longitudinal axis substantially parallel to the input surface. In some aspects, determining whether to identify the contact to the first area as spurious based at least in part on the determined orientation of the stylus at the time of the contact to the first area comprises: identifying the contact to the first area as not spurious based on a determination that, at the time of the contact to the first area, the stylus was oriented with the tip pointing away from the input surface. In some aspects, determining whether to identify the contact to the first area as spurious based at least in part on the determined orientation of the stylus at the time of the contact to the first area comprises: identifying the contact to the first area as not spurious based on a determination that, at the time of the contact to the first area, the stylus was oriented with the tip pointing toward the input surface but without the tip being in contact with the input surface. In some aspects, determining whether to identify the contact to the first area as spurious based at least in part on the determined orientation of the stylus at the time of the contact to the first area comprises: identifying the contact to the first area as spurious based on a determination that, at the time of the contact to the first area, the stylus was oriented with the tip being in contact with the input surface. In some aspects, the method further comprises transmitting a second electrical signal through an exterior surface of the tip. In some aspects, the method further comprises: identifying, using the one or more processors, a contact to a second area of the input surface based on one or more changes in electrical charge sensed in the second area; and determining, using the one or more processors, that the one or more changes in electrical charge sensed in the second area include the second electrical signal. In some aspects, determining whether to identify the contact to the first area as spurious based at least in part on the determined orientation of the stylus at the time of the contact to the first area comprises: identifying the contact to the first area as spurious based on a determination that, at the time of the contact to the first area, the stylus was oriented with the tip being in contact with the input surface. In some aspects, determining whether to identify the contact to the first area as spurious based at least in part on the determined orientation of the stylus at the time of the contact to the first area comprises: identifying the contact to the first area as spurious based on a determination that, at the time of the contact to the first area, the one or more changes in electrical charge sensed in the second area included the second electrical signal. In some aspects, the time of the contact to the first area is a period of time, and identifying the contact to the first area as spurious based on a determination that, at the time of the contact to the first area, the stylus was oriented with the tip being in contact with the input surface comprises: identifying the contact to the first area as spurious based on a determination that the stylus was oriented with the tip being in contact with the input surface during at least a portion of the period of time. In some aspects, the time of the contact to the first area is a period of time, and identifying the contact to the first area as spurious based on a determination that, at the time of the contact to the first area, the stylus was oriented with the tip being in contact with the input surface comprises: identifying the contact to the first area as spurious based on a determination that the tip of the stylus was never out of contact with the input surface for more than a predetermined threshold duration during the period of time. In some aspects, determining the orientation of the stylus at the time of the contact to the first area is based at least in part on an output of a tilt sensor included in the stylus. In some aspects, determining the orientation of the stylus at the time of the contact to the first area is based at least in part on an output of a gyro sensor included in the stylus. In some aspects, determining the orientation of the stylus at the time of the contact to the first area is based at least in part on an output of one or more accelerometers included in the stylus. In some aspects, determining the orientation of the stylus at the time of the contact to the first area is based at least in part on an output of a camera included in the stylus and configured to record image or video data. In some aspects, determining the orientation of a stylus at a time of the contact to the first area comprises: determining the orientation of the stylus relative to the input surface at the time of the contact to the first area. In some aspects, determining the orientation of the stylus relative to the input surface at the time of the contact to the first area is based at least in part on an output of one or more tilt sensors, gyro sensors, or accelerometers included in a housing containing the capacitive touch sensor.

In another aspect, the disclosure describes a system comprising: (1) a capacitive touch sensor having an input surface; (2) a stylus having a tip at a first end, a body extending from the tip to a second end, and a longitudinal axis extending from the first end to the second end, the stylus being configured to transmit a first electrical signal through an exterior surface of the body; (3) a memory; and (4) one or more processors coupled to the memory and configured to: identify a contact to a first area of the input surface based on one or more changes in electrical charge sensed in the first area; determine that the one or more changes in electrical charge sensed in the first area include the first electrical signal; and determine whether to identify the contact to the first area as spurious based at least in part on the determination that the one or more changes in electrical charge sensed in the first area include the first electrical signal.

In another aspect, the disclosure describes a computer-implemented method, comprising: transmitting a first electrical signal through an exterior surface of a body of a stylus, the stylus having a tip at a first end, the body extending from the tip to a second end, and a longitudinal axis extending from the first end to the second end; identifying, using one or more processors of a processing system, a contact to a first area of an input surface of a capacitive touch sensor based on one or more changes in electrical charge sensed in the first area; determining, using the one or more processors, that the one or more changes in electrical charge sensed in the first area include the first electrical signal; and determining, using the one or more processors, whether to identify the contact to the first area as spurious based at least in part on the determination that the one or more changes in electrical charge sensed in the first area include the first electrical signal.

BRIEF DESCRIPTION OF THE DRAWINGS

FIG. 11 depicts an exemplary method for determining whether to identify a contact as spurious, in accordance with aspects of the disclosure.

DETAILED DESCRIPTION

Figure 1:
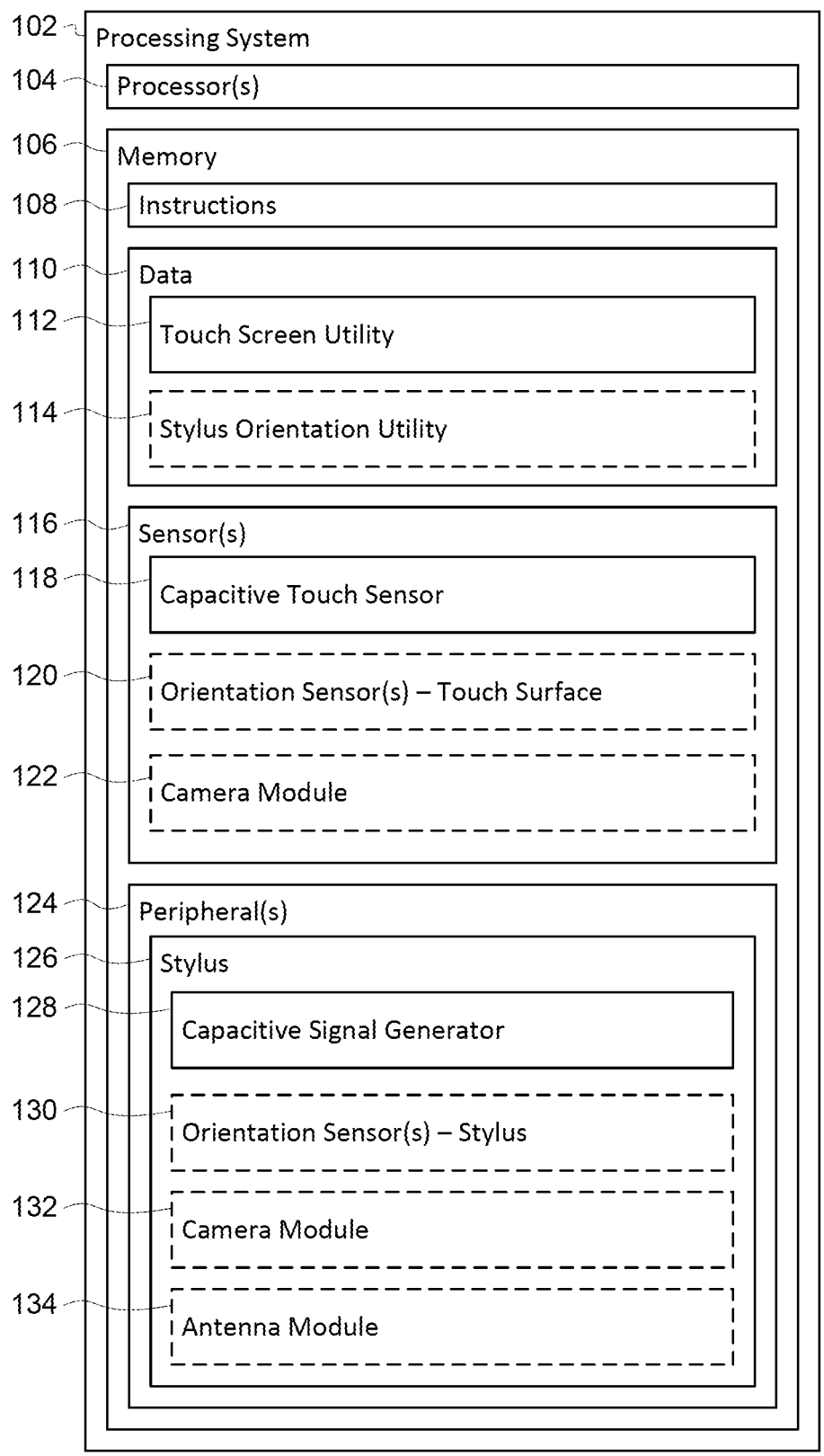
FIG. 1 is a functional diagram of an example processing system in accordance with aspects of the disclosure.

The present technology concerns the technical problem of identifying spurious signals in capacitive touch sensors. Spurious signals may arise in a variety of contexts, such as when a user is tapping or writing with the tip of a stylus, but also rests a portion of their hand on the input surface of a capacitive touch sensor. As the capacitive touch sensor may be configured to register touches from a user's hand (e.g., to enable the user to also generate inputs by tapping or swiping with one or more of their fingers), the portion of the user's hand which rests on the input surface may be recognized by the electronic device. It may thus be technically advantageous for the electronic device to be configured to identify when a contact from the user's hand is not intended to be an input, so that it may register those contacts as being spurious. However, in other instances, a user may intend to make inputs with their hand (e.g., pointing, swiping, pinching with a thumb and finger) while also holding a stylus in the same hand. It thus may likewise be technically advantageous for the electronic device to be configured to identify when a contact from the user's hand is intended to be an input, so that it may register those contacts accordingly.

The present technology provides technical solutions involving various systems and methods for identifying when signals are and are not spurious. In some aspects of the technology, a stylus may be configured to transmit a first electrical signal through at least a portion of its exterior surface and into the hand of a user such that the first electrical signal may be sensed by the capacitive touch sensor when the user's hand contacts the input surface of the capacitive touch sensor. In such a case, one or more processors of the capacitive touch sensor (or an associated electronic device) may be configured to identify a contact as coming from the user's hand by determining that changes in electrical charge sensed in a first area of the input surface include the first electrical signal. In some aspects, the stylus may be configured to only transmit the first electrical signal when it is held in certain orientations (e.g., when it is held with its tip oriented toward the input surface of the capacitive touch sensor), so that not all contacts from the user's hand will include the first electrical signal. Further, in some aspects, the stylus may be configured to transmit the first electrical signal regardless of how it is oriented, and the capacitive touch sensor (or associated device) may be configured to determine whether to identify a contact to the first area as being spurious based on how the stylus was oriented at the time of the contact to the first area.

The present technology and the technical advantages it provides will now be described with respect to the following exemplary systems and methods. Reference numbers in common between the figures depicted and described below are meant to identify the same features.

Example Systems

FIG. 1 shows a high-level system diagram 100 of an exemplary processing system 102 for performing the methods described herein. The processing system 102 may include one or more processors 104, memory 106 storing instructions 108 and data 110, one or more sensors 116, and one or more peripherals 124.

In the example of FIG. 1, the one or more sensors 116 includes a capacitive touch sensor 118 configured to sense contacts to a given area of its input surface based on one or more changes in electrical charge sensed in the given area. Capacitive touch sensor 118 may be incorporated into a touch pad, touch screen, or any other suitable device (e.g., electronic device 200 of FIG. 2, described below). In addition, the one or more sensors 116 may optionally include one or more orientation sensors 120 configured to sense an orientation of the input surface of the capacitive touch sensor 118, and a camera module 122 configured to record photographic or video data of the stylus 126 when it is in use.

In the example of FIG. 1, the one or more peripherals 124 include a stylus 126. The exemplary stylus 126 of FIG. 1 includes a capacitive signal generator 128 configured to transmit electrical signals through one or more surfaces of the stylus 126, and may optionally include one or more orientation sensors 130, a camera module 132, and/or an antenna module 134. The capacitive signal generator 128, orientation sensors 130, camera module 132, and antenna module 134 of stylus 126 are each described further below.

In the example of FIG. 1, data 110 includes a touch screen utility 112 configured to interpret inputs received through an input surface of the capacitive touch sensor 118, and determine whether to identify them as being spurious. In addition, data 110 may optionally include a stylus orientation utility 114, which may be configured to determine the orientation of the stylus 126. Utilities 112 and 114 may be implemented together or separately, as appropriate.

Figure 4:
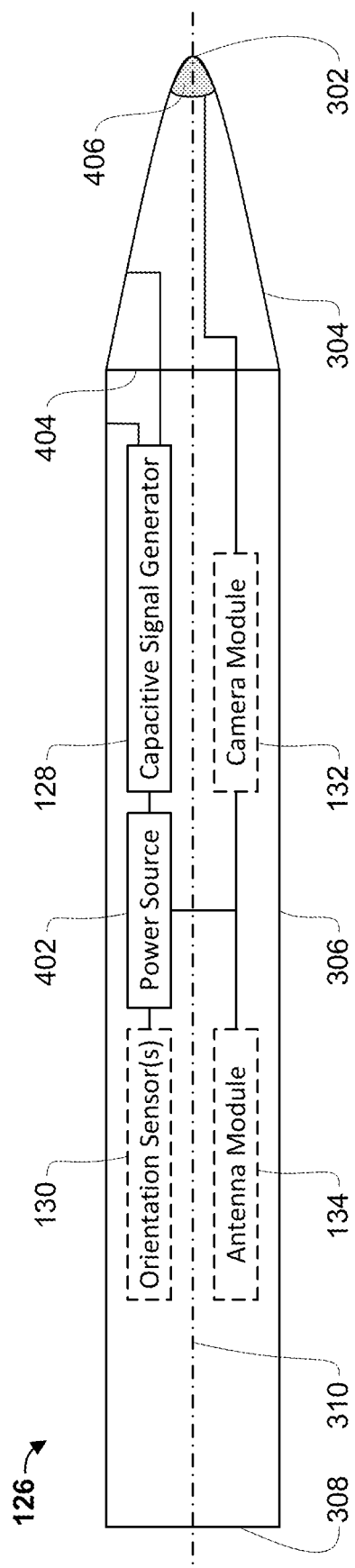
FIG. 4 is a functional diagram showing an exemplary configuration of the stylus of FIG. 3, in accordance with aspects of the disclosure.

The optional stylus orientation utility 114 may be configured to determine the orientation of stylus 126 based on any relevant orientation data. Relevant orientation data may include inputs from one or more orientation sensors 130 within the stylus 126, such as one or more tilt sensors, gyro sensors, proximity sensors, and/or accelerometers housed on or within the stylus 126. In some aspects, relevant orientation data may also include input from a camera (e.g., the cameras of camera module 122 or camera module 132) configured to record photographic or video data of the stylus 126, or from the stylus 126, when it is in use. The cameras of camera modules 122 and 132 may be mounted in any suitable location. For example, the camera of camera module 122 may be mounted within a portion of the device housing the capacitive touch sensor 118 (e.g., electronic device 200 of FIG. 2, described below). Likewise, the camera of camera module 132 may be mounted within the stylus 126, with a lens pointing out of the tip of stylus 126 such that the camera module 132 may record where the tip of the stylus is pointed (e.g., as shown in FIG. 4 and described further below). In addition, in some aspects, relevant orientation data may further include information regarding the orientation of the input surface of the capacitive touch sensor 118, such as a known orientation of the capacitive touch sensor 118 (e.g., that it is mounted vertically to a wall), and/or inputs from the one or more orientation sensors 120 (e.g., one or more tilt sensors, gyro sensors, or accelerometers within a housing of the capacitive touch sensor 118). The optional stylus orientation utility 114 may be any suitable utility for determining an orientation of the stylus, and may employ one or more heuristic or learned models.

Processing system 102 may be resident on a single computing device. For example, processing system 102 may be a server, personal computer, tablet, mobile phone, monitor, television, smart board, smart watch, or any other wearable electronic device, and the utilities (e.g., 112, 114) described herein may thus be local to that single computing device. Similarly, processing system 102 may be resident on a cloud computing system or other distributed system, such that one or more of the processors 104 and/or utilities (e.g., 112, 114) may be distributed across two or more different physical computing devices. For example, in some aspects, a portion of touch screen utility 112 responsible for sensing contacts to the capacitive touch sensor may be implemented on first computing device (e.g., a personal computer, tablet, mobile phone, monitor, television, smart board, smart watch, or other wearable electronic device), and a second portion of touch screen utility 112 responsible for determining whether the contacts should be identified as spurious may be implemented on a second computing device (e.g., a cloud-based server, different personal computer, different tablet, different mobile phone, etc.) which is accessible from the first computing device (e.g., through any wireless or wired communication protocol). Further, in some aspects, the stylus 126 may be equipped with one or more processors and memory, and may form part of a distributed processing system 102 with a second computing device (e.g., electronic device 200 of FIG. 2, or any other suitable personal computer, tablet, mobile phone, monitor, television, smart board, smart watch, or other wearable electronic device). For example, stylus 126 may be configured to store and execute one or more utilities (e.g., stylus orientation utility 114) and transmit data to a second computing device (e.g., electronic device 200 of FIG. 2, or any other suitable personal computer, tablet, mobile phone, monitor, television, smart board, smart watch, or other wearable electronic device) for use by other utilities (e.g., touch screen utility 112, an additional portion of stylus orientation utility 114) running on the second computing device.

The processing systems described herein may be implemented on any type of computing device(s), such as any type of general computing device, server, or set thereof, and may further include other components typically present in general purpose computing devices or servers. Likewise, the memory of such processing systems may be of any non-transitory type capable of storing information accessible by the processor(s) of the processing systems. For instance, the memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more additional user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Figure 2:
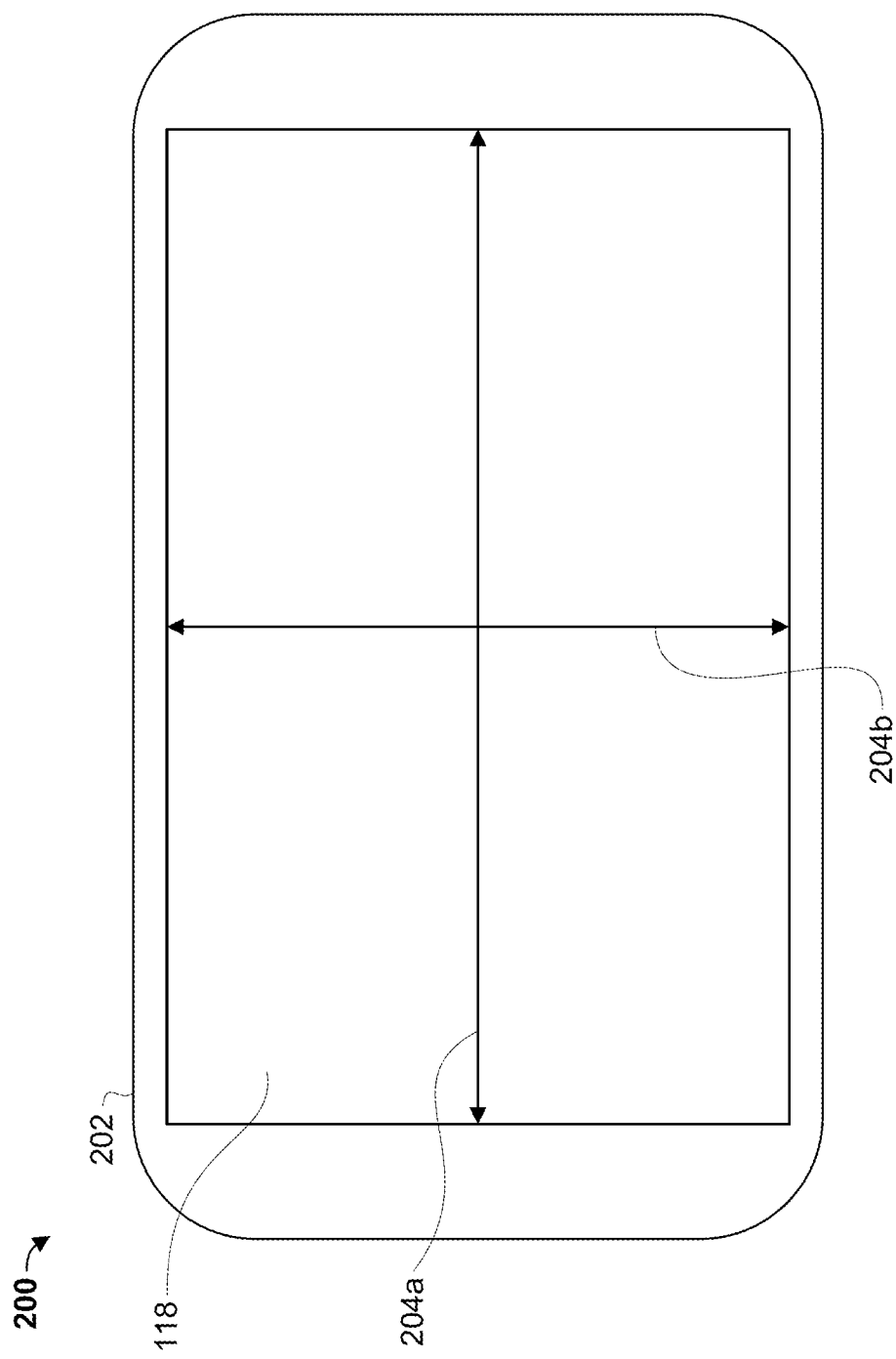
FIG. 2 depicts an example of an electronic device having a capacitive touch sensor, in accordance with aspects of the disclosure.

FIG. 2 depicts an example electronic device 200 having a capacitive touch sensor 118, in accordance with aspects of the disclosure. In that regard, in the example of FIG. 2, electronic device 200 is shown as a tablet, with capacitive touch sensor 118 being a capacitive touch screen held within a housing 202. However, the present technology may be applied to any suitable type of electronic device 200 (e.g., personal computer, tablet, mobile phone, monitor, television, smart board, smart watch, or other wearable electronic device) with any suitable type of capacitive touch sensor 118 (e.g., touch screen, touch pad). In addition, in the example of FIG. 2, capacitive touch sensor 118 is shown having a rectangular input surface with a width 204a and a height 204b. However, the present technology may be applied to a capacitive touch sensor 118 of any other suitable shape and/or size.

Figure 3:
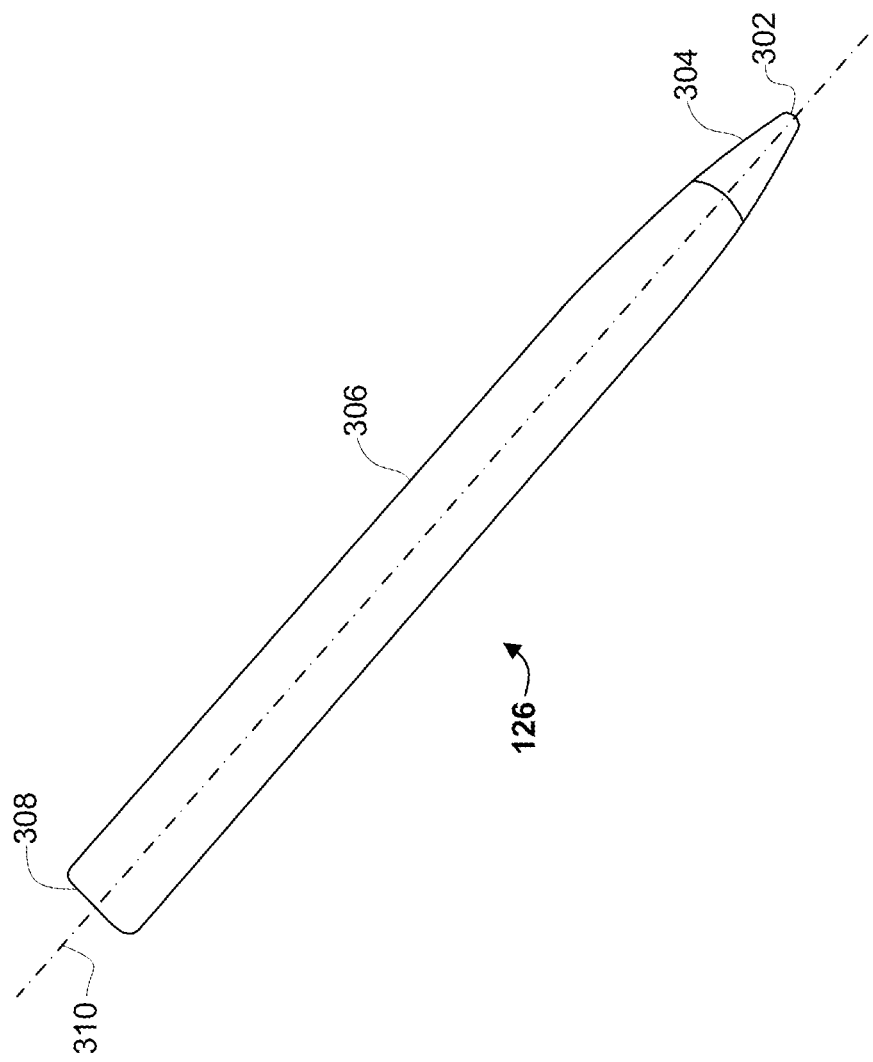
FIG. 3 depicts an example of a stylus, in accordance with aspects of the disclosure.

FIG. 3 depicts an example of a stylus 126, in accordance with aspects of the disclosure. In that regard, in the example of FIG. 3, stylus 126 is shown having a generally cylindrical body 306 and a tapered tip 304. The tip 304 is arranged at a first end 302 of the stylus 126, and the body extends from the tip 304 to a second end 308 of the stylus 126. The tip 304 and the body 306 are arranged along a longitudinal axis 310 which extends from the first end 302 to the second end 308. However, the present technology may be applied to a stylus 126 having any suitable shape and/or size.

FIG. 4 is a functional diagram 400 showing an exemplary configuration of the stylus 126 of FIG. 3, in accordance with aspects of the disclosure. In that regard, functional diagram 400 is meant to illustrate various components that may be included in stylus 126, but is not meant to be exhaustive, and is not meant to indicate the intended absolute or relative locations, orientations, sizes, or interconnections of any depicted block (e.g., signal generator 128, power source 402, orientation sensor(s) 130, camera module 132, antenna module 134, lens module 302, etc.).

In the example of FIG. 4, stylus 126 is shown having a power source 402 and a capacitive signal generator 128. Power source 402 may include one or more batteries housed within stylus 126, or may be circuitry configured to distribute power to the components of stylus 126 which is received from an external power source.

Capacitive signal generator 128 may be include any circuitry and/or component(s) suitable for transmitting a first electrical signal to the body 306 of stylus 126 such that the first electrical signal may be conducted by a user's hand to a capacitive touch sensor when a user's hand contacts the input surface of the capacitive touch sensor. For example, in some aspects of the technology, capacitive signal generator 128 may include: a microcontroller or pulse width modulation controller configured to emit a square wave signal at a given frequency (e.g., 1 kHz); a transistor, buck-boost converter, or amplifier configured to ensure that the signal is of a sufficiently high voltage; and an electrode configured to conduct the signal into a portion of the body 306 of the stylus 126 such that the signal will be conducted into the user's hand when the stylus 126 is in use. Likewise, in some aspects of the technology, capacitive signal generator 128 may be further configured to transmit a second electrical signal through an exterior surface of the tip 304 of stylus 126 such that it will be provided to the input surface of the capacitive touch sensor when the tip 304 contacts the input surface. In the example of FIG. 4, stylus 126 additionally includes an insulator 404 configured to electrically isolate the exterior surface of tip 304 from the exterior surface of body 306 so that the first electrical signal cannot reach the exterior surface of tip 304, and (where applicable) so that the second electrical signal cannot reach the exterior surface of the body 306.

As shown in FIG. 4, stylus 126 may also optionally include one or more orientation sensors 130, a camera module 132 (including a lens module 406), and/or an antenna module 134. As already described above with respect to FIG. 1, the one or more orientation sensors 130 may include any sensor suitable for providing information regarding the orientation of the stylus 126, such as one or more tilt sensors, gyro sensors, accelerometers, etc. Stylus 126 and/or the one or more orientation sensors 130 may further include one or more processors and memory (not shown) storing one or more utilities configured to process the output of the one or more orientation sensors 130 and/or to make determinations based thereon (e.g., stylus orientation utility 114 of FIG. 1).

The optional camera module 132 and associated lens module 406 may be any suitable image capture mechanism, including a digital still camera, digital video camera, etc. Lens module 132 may further include a light source (not shown) such as one or more light-emitting diodes configured to project light out of the stylus 126 (e.g., through a lens of lens module 406). Although the lens module 406 is shown in FIG. 4 being oriented directly out of the first end 302 of stylus 126, it will be understood that the lens (or multiple lenses) of lens module 406 may be positioned in any other suitable location(s). Stylus 126 and/or camera module 132 may further include one or more processors and memory (not shown) storing a utility configured to identify the input surface of the capacitive touch sensor 118 when it is visible in the images captured by the camera module 132. For example, in some aspects of the technology, such a utility may be configured to process the images captured by the camera module 132 to recognize the size and shape of the input surface, a boundary around the input surface, a particular color of light, flicker-rate, or other optical signature of a screen co-located with the input surface (as in a touch screen), etc.

Optional antenna module 134 may include any suitable type of antenna, and may be configured to transmit and/or receive information using any suitable transmission protocol. In some aspects of the technology, the stylus 126 may be configured to use antenna module 134 to transmit data regarding its orientation (e.g., data from orientation sensor(s) 130 and/or camera 132, or determinations based thereon) to another device (e.g., electronic device 200) in order to allow the other device to make one or more determinations based on the orientation of stylus 126. Likewise, in some aspects of the technology, the stylus 126 may be configured to use antenna module 134 to receive data regarding the orientation of another device (e.g., the orientation of the input surface of the capacitive touch sensor 118 of electronic device 200) in order to aid the stylus 126 in determining its own orientation relative to the other device. Here as well, stylus 126 and/or antenna module 134 may further include one or more processors and memory (not shown) storing one or more utilities for transmitting and receiving data.

Although FIG. 4 shows the capacitive signal generator 128, orientation sensor(s) 130, camera module 132, lens module 302, and antenna module 134 as separate blocks, any or all of these may be combined and implemented as part of one or more integrated circuits, application-specific or general purpose processors, etc. Further in that regard, the exemplary functional diagram of FIG. 4 is not meant to be exhaustive. Accordingly, and as described above, stylus 126 may further include one or more processors and/or memory (e.g., which may constitute part of the processor(s) 104 and memory 106 of a distributed processing system 102), and further circuitry, components, and modules not shown in FIG. 4.

Figure 5A:
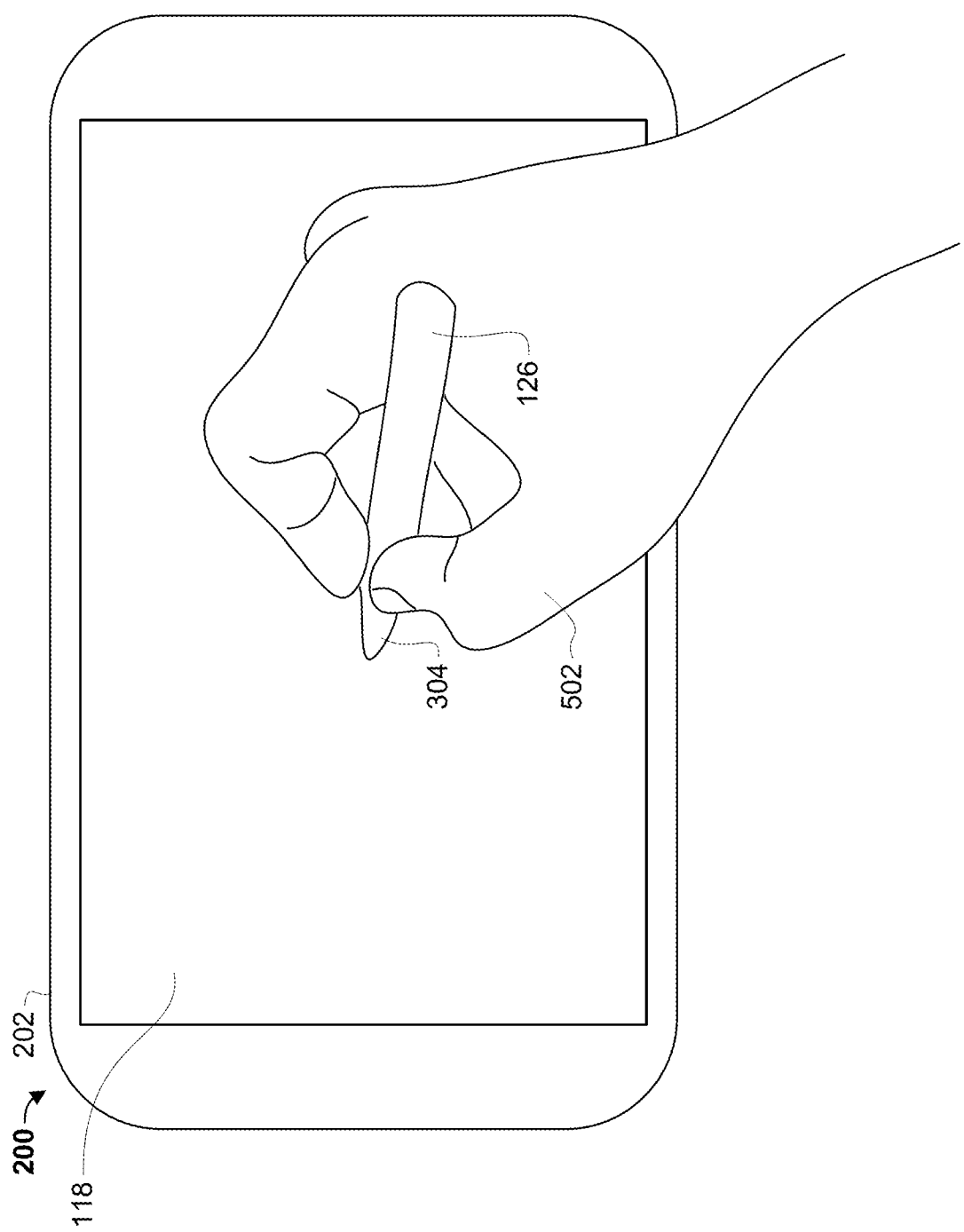
FIGS. 5A-5C illustrate an exemplary use of the stylus of FIG. 3 with the electronic device of FIG. 2 and resulting contact areas, in accordance with aspects of the disclosure.
Figure 5B:
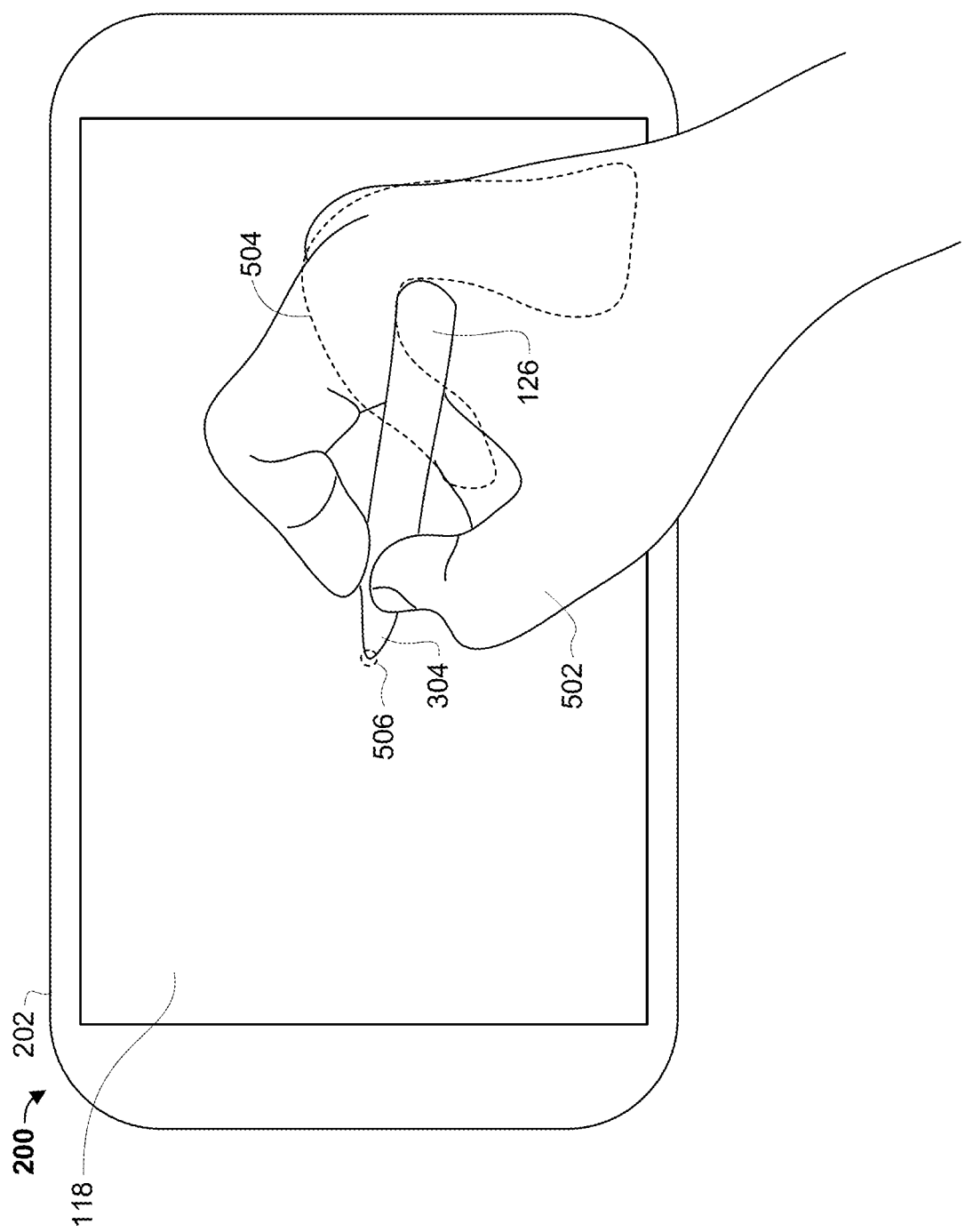
Figure 5C:
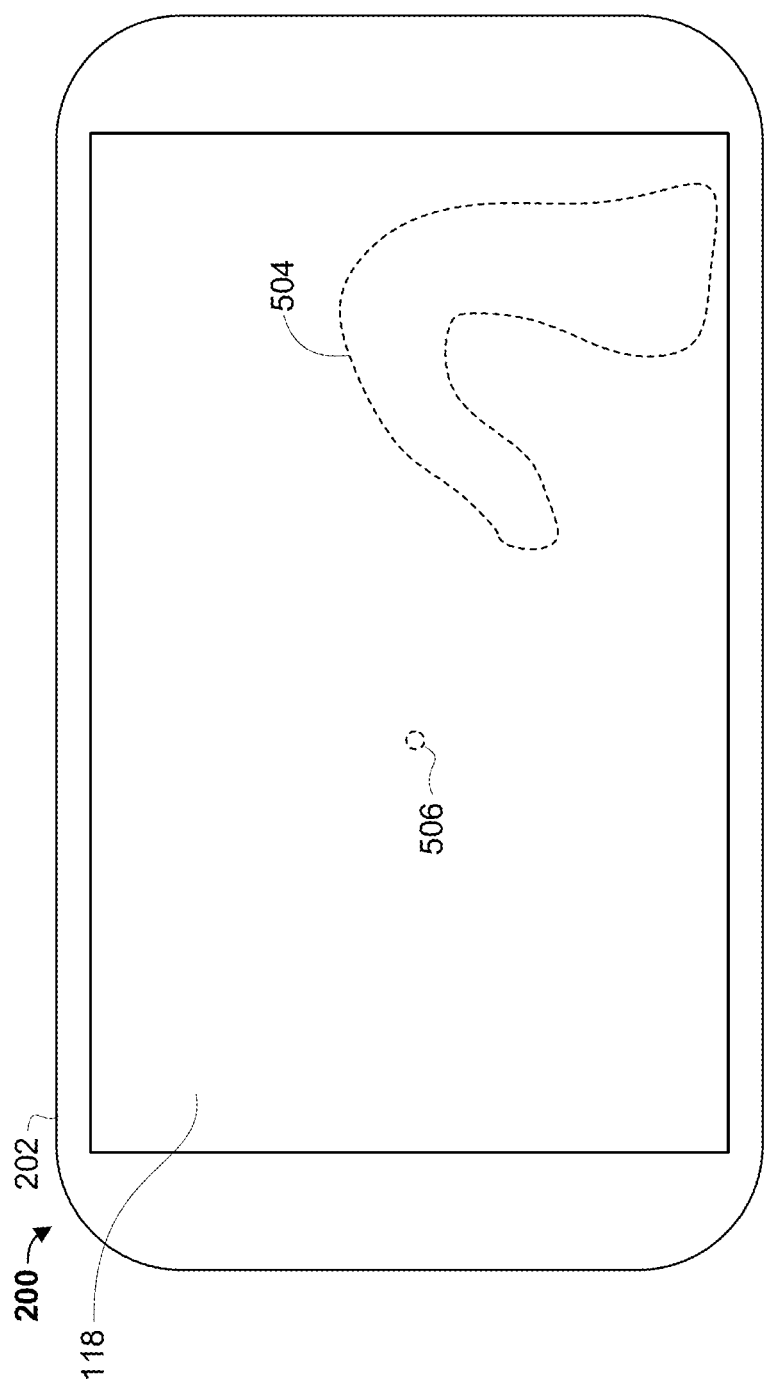

FIGS. 5A-5C illustrate an exemplary use of the stylus 126 of FIG. 3 with the electronic device 200 of FIG. 2, and the contact areas that may result, in accordance with aspects of the disclosure. In that regard, FIG. 5A depicts stylus 126 being held by a user's hand 502, with tip 304 in contact with the input surface of capacitive touch sensor 118. FIG. 5A thus depicts stylus 126 as it may be oriented when a user is using the stylus 126 to write or indicate a selection on a touch screen or touch surface.

FIG. 5B illustrates how the arrangement of FIG. 5A may result in two different contact areas. In that regard, where the right side of the user's hand 502 is resting on the input surface of the capacitive touch sensor 118, it is shown forming a first contact area 504 indicated with a dashed line. Similarly, where the tip 304 of stylus 126 is contacting the input surface of the capacitive touch sensor 118, it is shown forming a second contact area 506. For clarity, FIG. 5C omits hand 502 and stylus 126 so that the contact areas 504 and 506 are shown in isolation.

Where a user is using stylus 126 to tap or write on the input surface of the capacitive touch sensor 118, and is resting a portion of their hand 502 on the input surface as shown in FIG. 5A, it may be desirable for the electronic device 200 to be configured to identify the first contact area 504 created by the user's hand as being spurious, so that only the second contact area 506 produced by the stylus 126 is registered as an intentional input. In such a case, the stylus 126 may be configured to use its capacitive signal generator 128 to transmit a first electrical signal through an exterior surface of its body 306, such that the first electrical signal will be conducted by the user's hand 502 and will produce corresponding changes in the electrical charge sensed by the capacitive touch sensor 118 in the first contact area 504.

As part of the technical solution presented herein, the electronic device 200 may be configured to identify that the user's hand 502 is making contact with the input surface at the first contact area 504 based on one or more changes in electrical charge sensed in the first contact area 504, and may further be configured to determine that the one or more changes in electrical charge sensed in the first contact area 504 include the first electrical signal. The electronic device 200 may be configured to make this determination based on any suitable criteria, including one or more of a frequency of the changes in electrical charge, a phase of the changes in electrical charge, or an amplitude of the changes in electrical charge. Based on this determination, the electronic device 200 may then be configured to identify the contact to the first contact area 504 as being spurious.

Thus, in some aspects of the technology, the electronic device 200 may be configured to determine that the one or more changes in electrical charge sensed in the first area 504 include the first electrical signal based at least in part on the changes in electrical charge having a particular frequency or pattern of frequencies. For example, the capacitive signal generator 128 of the stylus 126 may be configured to transmit a first electrical signal having a predetermined frequency or pattern of frequencies. That first electrical signal may thus create changes in charge in the capacitive touch sensor 118 that have the same or a similar frequency or pattern of frequencies, such that the electronic device 200 may determine that the one or more changes in electrical charge sensed in the first area 504 include the first electrical signal.

Likewise, in some aspects of the technology, the electronic device 200 may be configured to determine that the one or more changes in electrical charge sensed in the first area 504 include the first electrical signal based at least in part on the changes in electrical charge having a phase that varies in a particular way. For example, the capacitive signal generator 128 of the stylus 126 may be configured to transmit a first electrical signal in which the phase of the signal is varied in predetermined way. That first electrical signal may thus create changes in charge in the capacitive touch sensor 118 that have the same or a similar pattern of phase changes, such that the electronic device 200 may determine that the one or more changes in electrical charge sensed in the first area 504 include the first electrical signal.

Further, in some aspects of the technology, the electronic device 200 may be configured to determine that the one or more changes in electrical charge sensed in the first area 504 include the first electrical signal based at least in part on the changes in electrical charge having a particular amplitude or pattern of amplitudes. For example, the capacitive signal generator 128 of the stylus 126 may be configured to transmit a first electrical signal having a predetermined amplitude or pattern of amplitudes. That first electrical signal may thus create changes in charge in the capacitive touch sensor 118 that have the same or a similar amplitude or pattern of amplitudes, such that the electronic device 200 may determine that the one or more changes in electrical charge sensed in the first area 504 include the first electrical signal.

In some aspects of the technology, the stylus 126 may be configured to transmit the first electrical signal through an exterior surface of its body 306 only while it is oriented in a particular way. For example, the stylus 126 may be configured to only transmit the first electrical signal through the exterior surface of the body 306 when its tip 304 is pointing toward the input surface of the capacitive touch sensor 118. In such a case, the stylus 126 may thus cease transmitting the first electrical signal through the exterior surface of the body 306 when it is determined that tip 304 is not pointing toward the input surface of the capacitive touch sensor 118, which may allow the electronic device 200 to then register contacts between the user's hand and the input surface as normal. In some aspects of the technology, the stylus 126 may be configured to determine that tip 304 is not pointing toward the input surface of the capacitive touch sensor 118 if the stylus 126 is oriented with its longitudinal axis 310 parallel to the input surface of the capacitive touch sensor 118. In some aspects of the technology, the stylus 126 may be configured to determine that tip 304 is not pointing toward the input surface of the capacitive touch sensor 118 if the stylus 126 is oriented with its longitudinal axis 310 substantially parallel to the input surface of the capacitive touch sensor 118. In some aspects of the technology, the stylus 126 may be configured to determine that tip 304 is not pointing toward the input surface of the capacitive touch sensor 118 if the stylus 126 is oriented such that its longitudinal axis 310 falls within some predetermined range of angles relative to the input surface of the capacitive touch sensor 118 (e.g., when an angle (with tip 304 at the vertex) between the longitudinal axis 310 and the input surface is less than 5 degrees, less than 10 degrees, less than 15 degrees, etc.). Likewise, in some aspects, the stylus 126 may be configured to determine that tip 304 is not pointing toward the input surface of the capacitive touch sensor 118 if tip 304 is pointing away from the input surface of the capacitive touch sensor 118. The stylus 126 may be configured to determine how its tip 304 is oriented based on any suitable data, including: outputs or determinations of one or more orientation sensors 130 and/or a camera module 132 of stylus 126; data regarding a known orientation of the electronic device 200 (e.g., that the electronic device 200 is mounted to a wall such that the input surface of the capacitive touch sensor 118 is oriented vertically); and/or outputs or determinations received from one or more orientation sensors 120 and/or a camera module 122 of the electronic device 200 (e.g., as may be received through the antenna module 134 of stylus 126).

In some aspects of the technology, the stylus 126 may be configured to transmit the first electrical signal through the exterior surface of the body regardless of its orientation. In such cases, the electronic device 200 may be further configured to identify the contact to the first contact area 504 as being spurious based on a determination of how the stylus 126 was oriented at the time (e.g., single time or period of time) that the user's hand 502 was in contact with the first contact area 504. The electronic device 200 may be configured to make this determination based on any suitable data, including: outputs or determinations of one or more of the orientation sensors 130 and/or camera module 132 of stylus 126 (e.g., which data may be provided from stylus 126 to electronic device 200 via antenna module 134); outputs or determinations of a camera module 122 of the electronic device 200; and/or the outputs or determinations of one or more orientation sensors 120 of the electronic device 200 (e.g., which may be used together with other data to determine the orientation of the stylus 126 relative to the electronic device 200).

In addition, in some aspects of the technology, the electronic device 200 may be configured to determine how the stylus 126 was oriented at the time (e.g., single time or period of time) that the user's hand 502 was in contact with the first contact area 504 based (in whole or in part) on a determination of whether the tip 304 of the stylus 126 was in contact with the second contact area 506 when the user's hand 502 was making contact with the first contact area 504. This determination may also be based on any suitable data. Thus, in some aspects of the technology, the electronic device 200 may identify a contact at the second contact area 506 and determine that the changes in electrical charge sensed in that area include a second electrical signal that was transmitted by capacitive signal generator 128 through an exterior surface of the tip 304 of stylus 126. Likewise, in some aspects, the electronic device 200 may receive information from stylus 126 (e.g., transmitted from its antenna module 134) identifying that tip 304 was in contact with the input surface of the capacitive touch sensor 118 (e.g., based on data and/or determinations of a camera module 132). Further, in some aspects, the electronic device 200 may have one or more dedicated sensors specifically configured to track an active signal from the tip 304 of stylus 126. In such cases, the electronic device 200 may base its determination of how the stylus 126 was oriented at the time that the user's hand 502 was in contact with the first contact area 504 (in whole or in part) on whether it was also sensing the active signal from the tip 304 of stylus 126 at that time.

Further, in some aspects of the technology, the electronic device 200 may be configured to identify the contact to the first contact area 504 as being spurious based on a determination that the tip 304 of the stylus 126 was in contact with the input surface of the capacitive touch sensor 118 during a portion of a period of the time during which the user's hand 502 was in contact with the first contact area 504. For example, the electronic device 200 may be configured to: determine whether the tip 304 of the stylus 126 was in contact with some portion of the input surface (e.g., the second contact area 506 or another area) while the user's hand 502 was making contact with the first contact area 504; begin a timer if the tip 304 ceases to be in contact with the input surface while the user's hand 502 remains in contact with the first contact area 504; and continue to identify the contact to the first contact area 504 as being spurious until the timer reaches some predetermined threshold duration (e.g., 1 second, 2 seconds, 10 second, 30 seconds, etc.). One technical advantage is that this approach may reduce the likelihood that the electronic device 200 will register contacts between the user's hand 502 and the first contact area 504 when the tip 304 of the stylus 126 is making regular, but intermittent, contacts with input surface, such as may occur when a user is writing and thus lifting the tip 304 of stylus 126 between letters or words, or when a user is using the stylus 126 to tap successive fields and soft buttons on a touch screen (e.g., when filling out a form).

Further, in some aspects of the technology, the electronic device 200 may be configured to determine how the stylus 126 was oriented at the time (e.g., single time or period of time) that the user's hand 502 was in contact with the first contact area 504 based (in whole or in part) on a determination of whether the tip 304 of the stylus 126 was positioned near the second contact area 506 when the user's hand 502 was making contact with the first contact area 504. This determination may also be based on any suitable data. Thus, in some aspects of the technology, the one or more orientation sensors 130 of the stylus 126 may include one or more proximity sensors configured to sense when the tip 304 is close to the input surface of the electronic device 200 (e.g., electrostatically). Likewise, in some aspects of the stylus 126 may be configured to use output from the camera module 130 to determine when the tip 304 is close to the input surface of the electronic device. In either case, as part of the technical solution, the stylus 126 may be configured to inform the electronic device 200 (e.g., using antenna module 134) when the tip 304 is near the input surface, and the electronic device 200 may be configured to base its determination of how the stylus 126 was oriented at the time that the user's hand 502 was in contact with the first contact area 504 (in whole or in part) on data it receives from stylus 126 regarding the proximity of the tip 304 to the input surface.

Figure 6A:
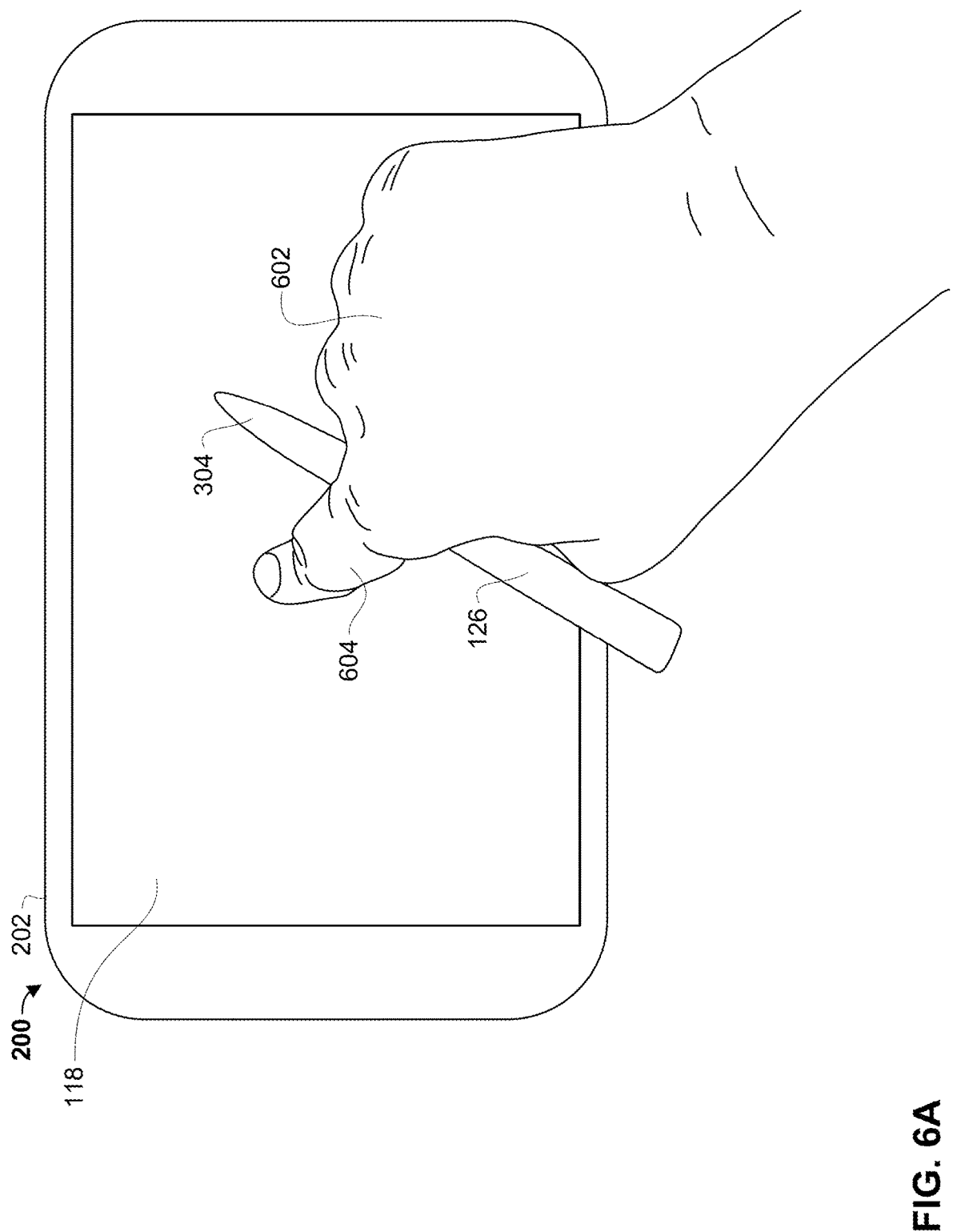
FIGS. 6A-6C illustrate an exemplary use of the stylus of FIG. 3 with the electronic device of FIG. 2 and a resulting contact area, in accordance with aspects of the disclosure.
Figure 6B:
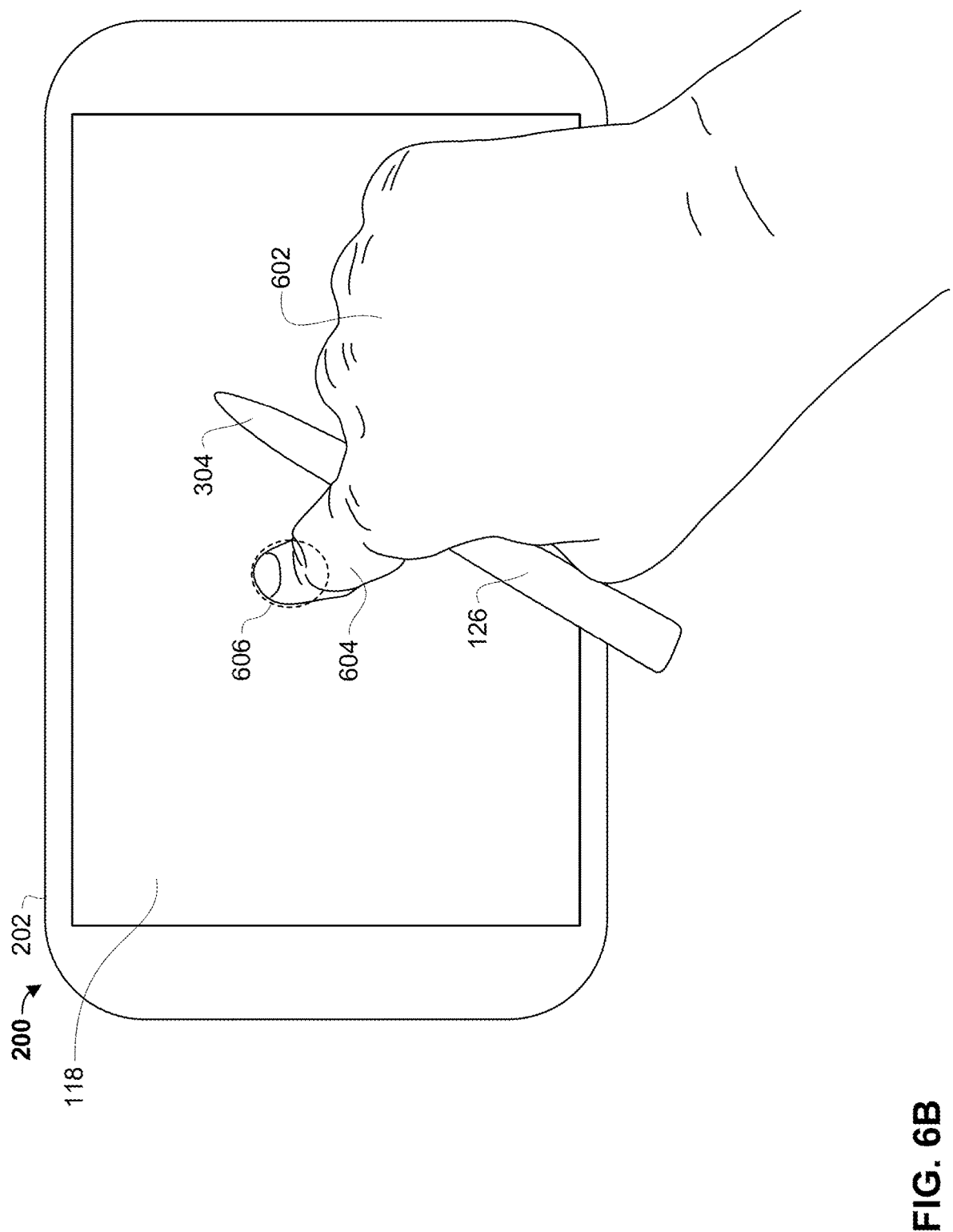
Figure 6C:
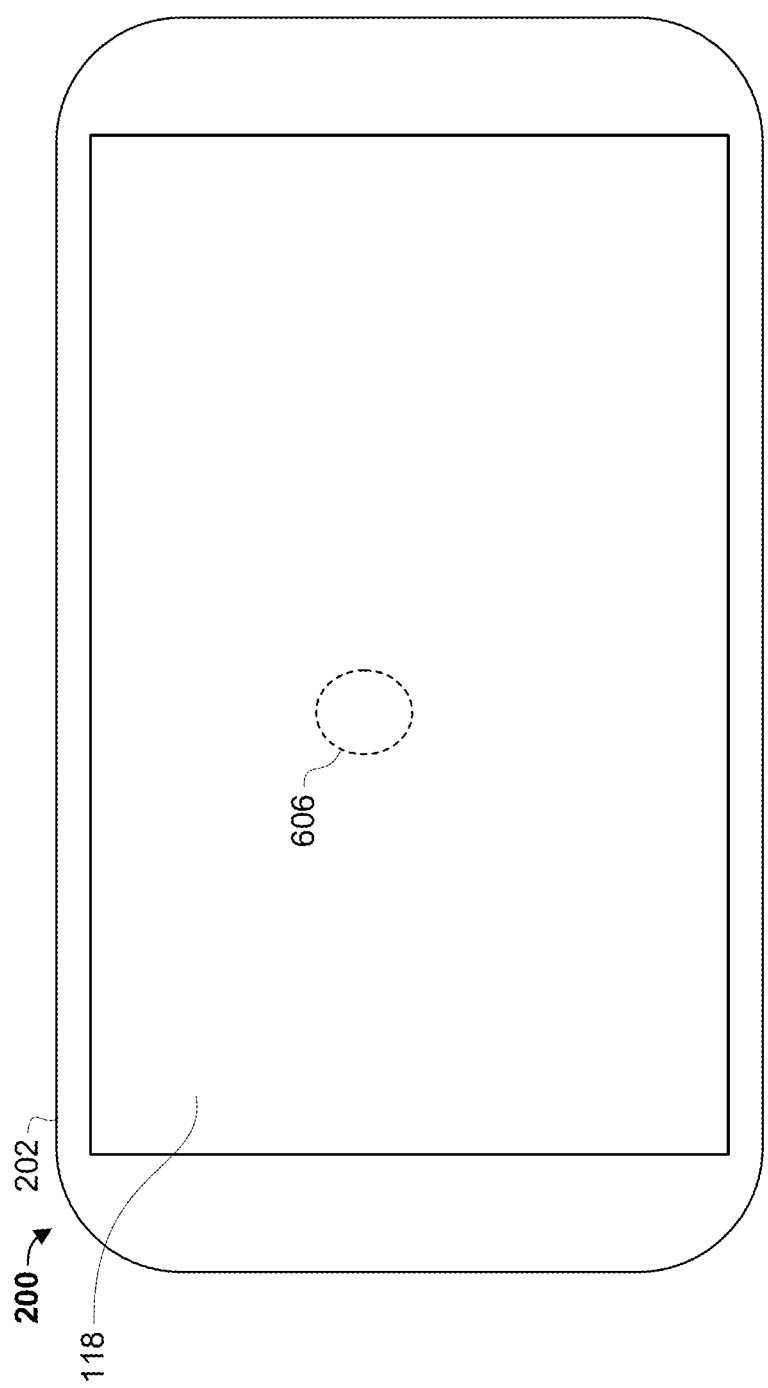

FIGS. 6A-6C illustrate another exemplary use of the stylus 126 of FIG. 3 with the electronic device 200 of FIG. 2, and the contact area that may result, in accordance with aspects of the disclosure. In that regard, FIG. 6A depicts stylus 126 being held by a user's hand 602 in a parallel or substantially parallel orientation relative to the input surface of the capacitive touch sensor 118. while the user is intentionally contacting the input surface with their index finger 604. FIG. 6A thus depicts stylus 126 as it may be oriented when a user is in the midst of using the stylus 126, but stops using it temporarily in order to tap or swipe using their finger. FIG. 6B illustrates how the arrangement of FIG. 6A may result in a single contact area 606 underneath the tip of the user's index finger 604, and FIG. 6C omits hand 602 and stylus 126 so that the contact area 606 is shown in isolation for clarity.

Figure 7A:
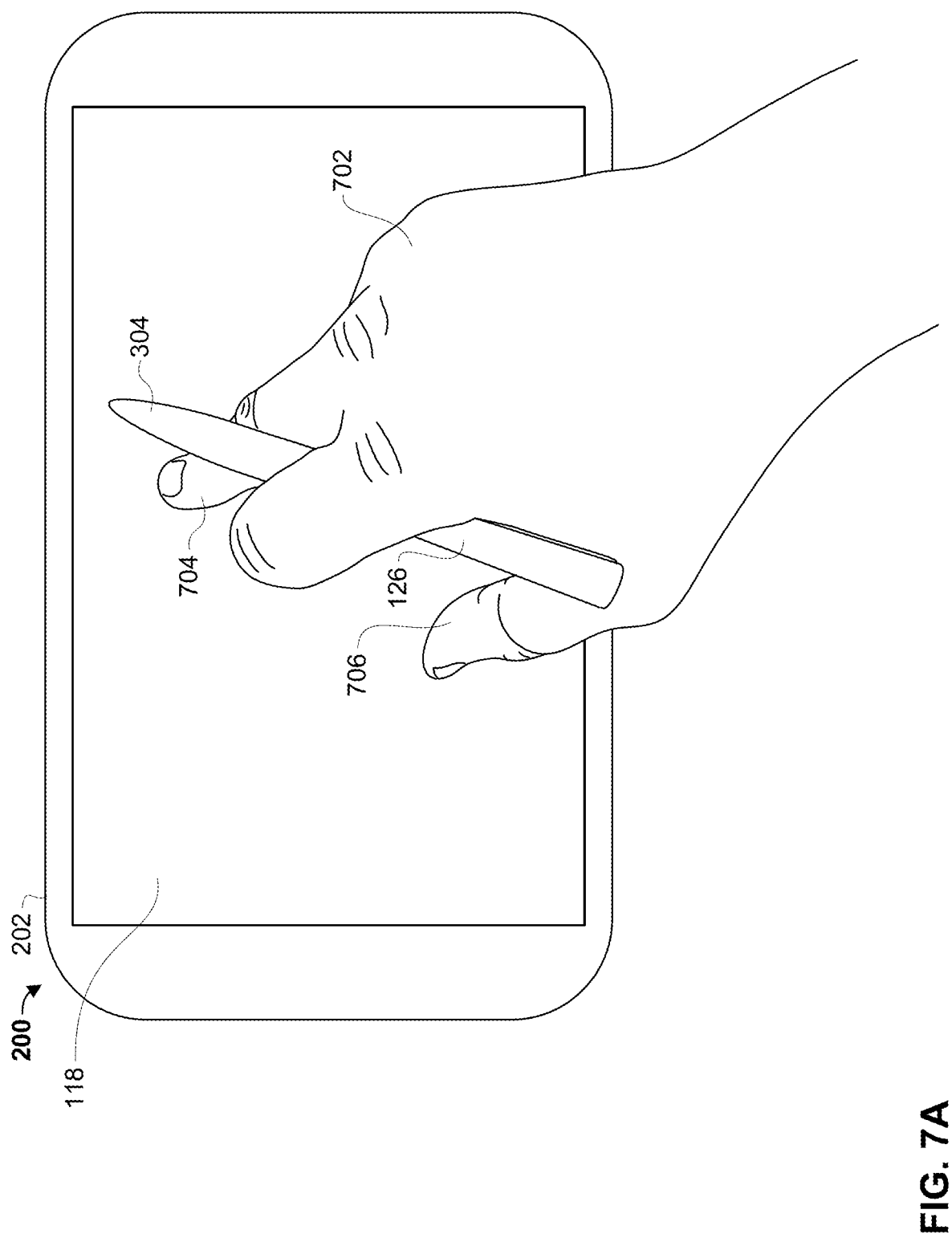
FIGS. 7A-7C illustrate an exemplary use of the stylus of FIG. 3 with the electronic device of FIG. 2 and resulting contact areas, in accordance with aspects of the disclosure.
Figure 7B:
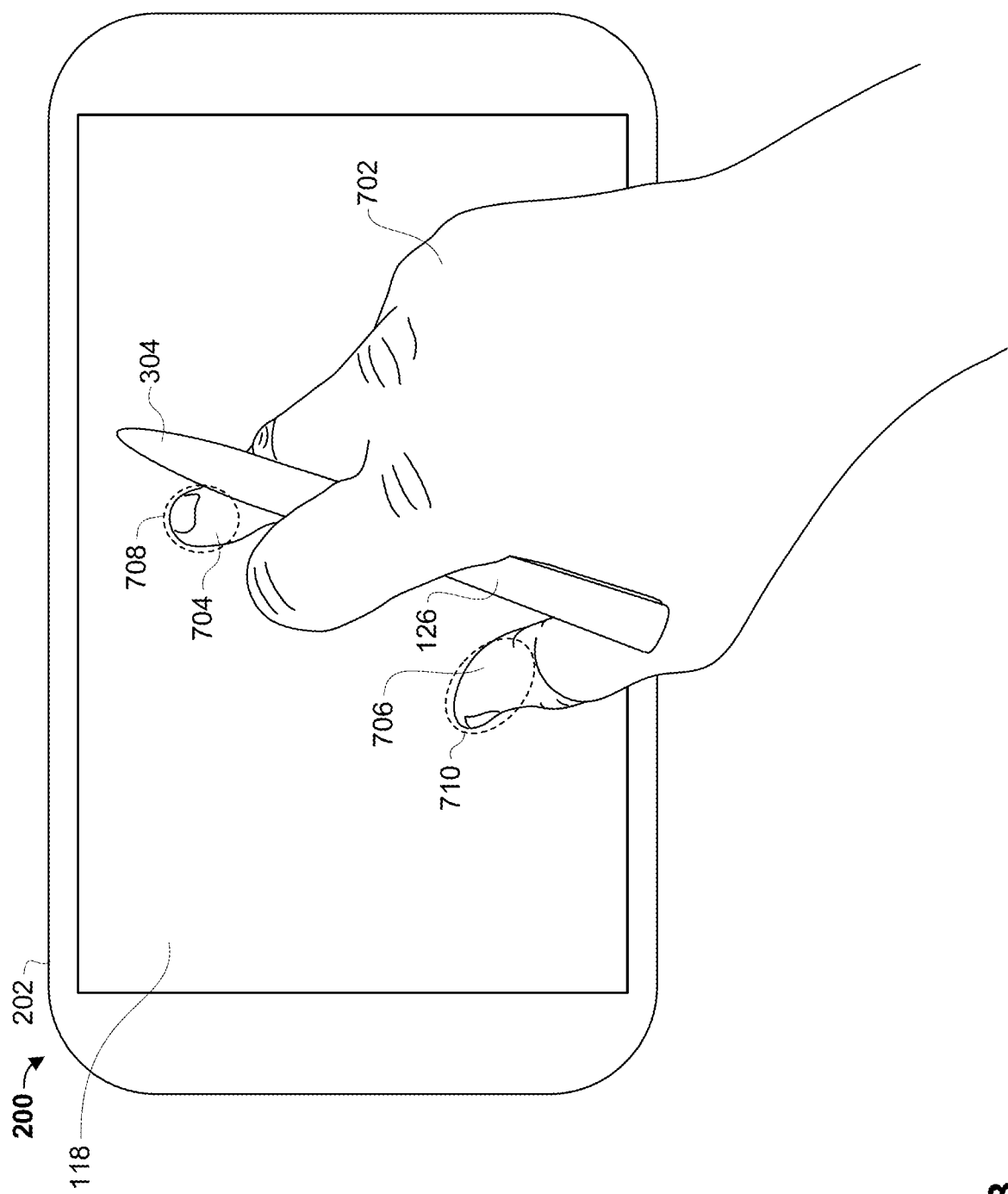
Figure 7C:
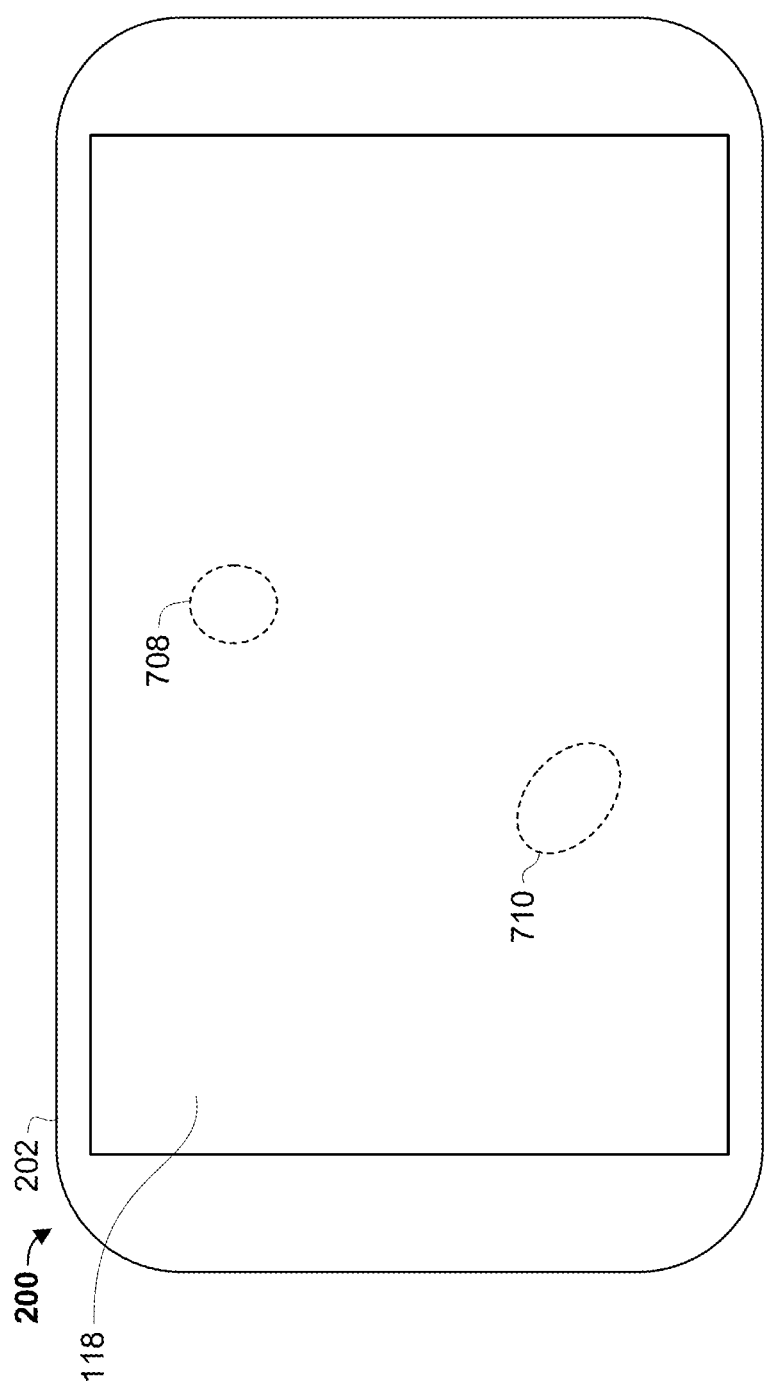

FIGS. 7A-7C illustrate another exemplary use of the stylus 126 of FIG. 3 with the electronic device 200 of FIG. 2, and the contact areas that may result, in accordance with aspects of the disclosure. In that regard, FIG. 7A depicts stylus 126 being held by a user's hand 702 in an orientation where its tip is pointing away from the input surface of the capacitive touch sensor 118, while the user is intentionally contacting the input surface with their middle finger 704 and thumb 706. FIG. 7A thus depicts stylus 126 as it may be oriented when a user is in the midst of using the stylus 126, but stops using it temporarily in order to perform a pinch or reverse-pinch motion on the input surface using their fingers. FIG. 7B illustrates how the arrangement of FIG. 7A may result in a contact area 708 underneath the tip of the user's middle finger 704 and another contact area 710 underneath the side of the user's thumb 706, and FIG. 7C omits hand 702 and stylus 126 so that the contact areas 708 and 710 are shown in isolation for clarity.

Figure 8A:
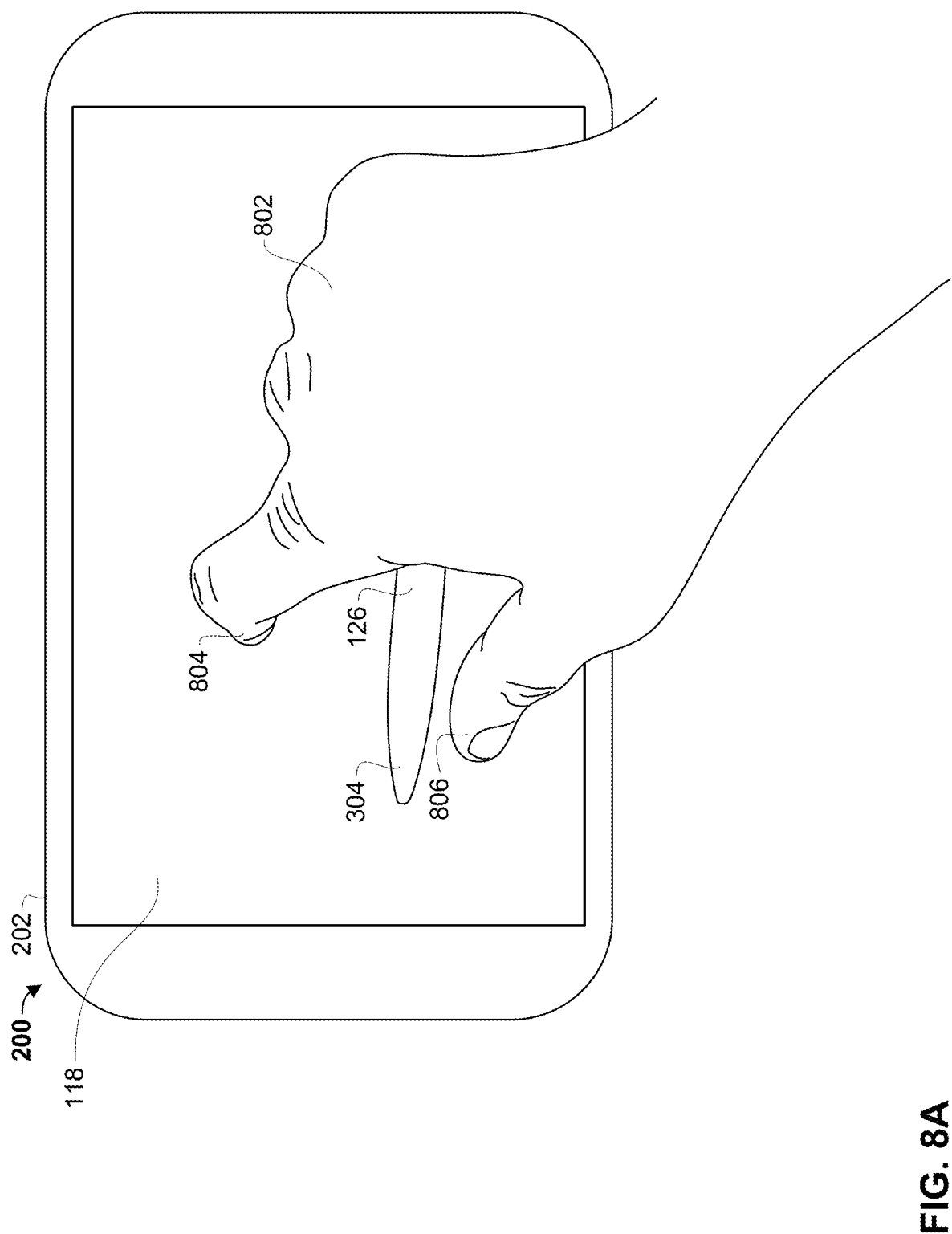
FIGS. 8A-8C illustrate an exemplary use of the stylus of FIG. 3 with the electronic device of FIG. 2 and resulting contact areas, in accordance with aspects of the disclosure.
Figure 8B:
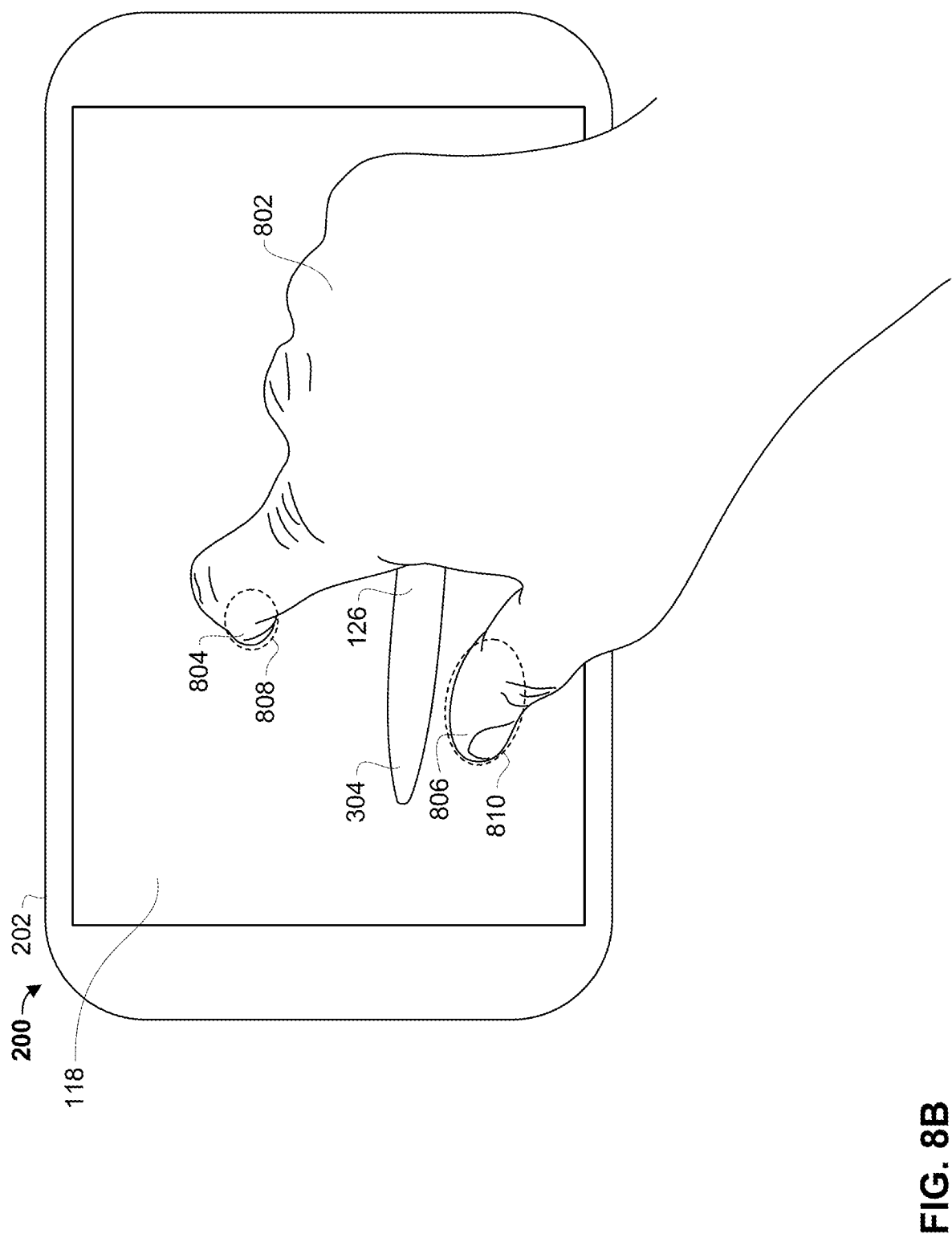
Figure 8C:
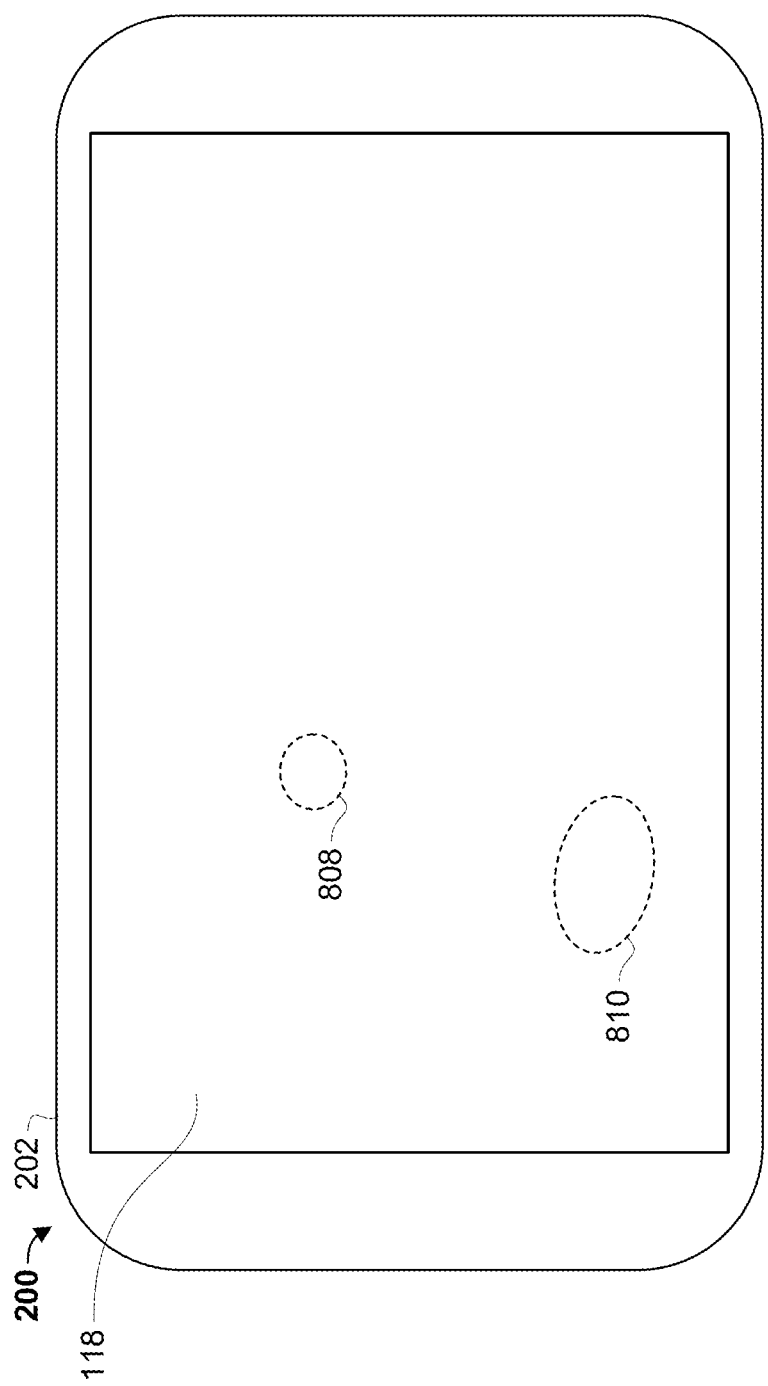

FIGS. 8A-8C illustrate another exemplary use of the stylus 126 of FIG. 3 with the electronic device 200 of FIG. 2, and the contact areas that may result, in accordance with aspects of the disclosure. In that regard, FIG. 8A depicts stylus 126 being held by a user's hand 802 in an orientation that is parallel or substantially parallel to the input surface of the capacitive touch sensor 118, while the user is intentionally contacting the input surface with their index finger 804 and thumb 806. FIG. 8A thus also depicts stylus 126 as it may be oriented when a user is in the midst of using the stylus 126, but stops using it temporarily in order to perform a pinch or reverse-pinch motion on the input surface using their fingers. FIG. 8B illustrates how the arrangement of FIG. 8A may result in a contact area 808 underneath the tip of the user's index finger 804 and another contact area 810 underneath the side of the user's thumb 806, and FIG. 8C omits hand 802 and stylus 126 so that the contact areas 808 and 810 are shown in isolation for clarity.

Where a user is holding stylus 126 while using one or more fingers to intentionally contact the input surface of the capacitive touch sensor 118 as shown in FIGS. 6A, 7A, and 8A, it may be desirable for the electronic device 200 to be configured to identify the resulting contact area(s) (e.g., contact area 606, contact areas 708 and 710, or contact areas 808 and 810) created by the user's hand as not being spurious, so that they may be registered as intentional inputs. Thus, in some aspects of the technology, where the stylus 126 is configured to use its capacitive signal generator 128 to transmit a first electrical signal through an exterior surface of its body 306 when its tip is pointing toward the input surface of the capacitive touch sensor 118, the technical solution may include the stylus 126 being further configured to not transmit the first electrical signal through body 306 based on a determination that its tip 304 is not pointing toward the input surface (as described above). Likewise, in some aspects of the technology, where the stylus 126 is configured to transmit the first electrical signal through the exterior surface of the body regardless of its orientation, the electronic device 200 may be configured to identify a contact to a given contact area (e.g., contact area 606, contact areas 708 and 710, or contact areas 808 and 810) as not being spurious based on a determination that the stylus was not pointing toward the input surface at the time that the user's hand (e.g., hand 602, 702, or 802) contacted the given contact area (as described above). Further, in some aspects of the technology, the electronic device 200 may be configured to identify a contact to a given contact area (e.g., contact area 606, contact areas 708 and 710, or contact areas 808 and 810) as not being spurious based on a determination that the stylus was not in contact with the input surface at the time that the user's hand (e.g., hand 602, 702, or 802) contacted the given contact area (as described above).

Example Methods

Figure 9:
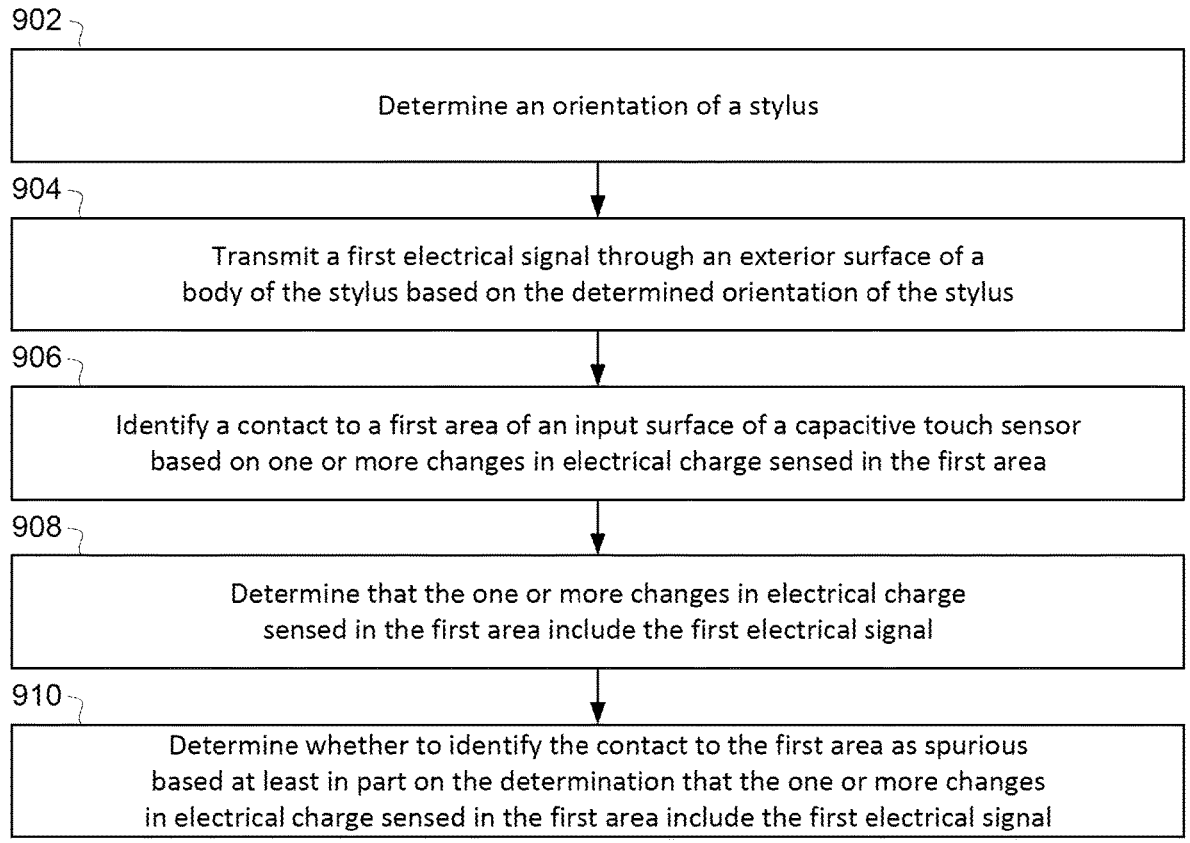
FIG. 9 depicts an exemplary method for determining whether to identify a contact as spurious, in accordance with aspects of the disclosure.

FIG. 9 depicts an exemplary method 900 for determining whether to identify a contact as spurious, in accordance with aspects of the disclosure. In that regard, FIG. 9 sets forth one exemplary way that may be used by a processing system (e.g., a processing system 102 including an electronic device 200 and a stylus 126) to determine whether a contact by a user's hand (e.g., as may occur in the scenarios described above with respect to FIGS. 5A-8C) should be identified as spurious or intentional. In particular, FIG. 9 sets forth an exemplary method that may be employed where the stylus is configured to only transmit a first electrical signal through its body when its tip is pointing toward an input surface of a capacitive touch sensor.

Thus, in step 902, the processing system determines an orientation of the stylus. For example, the processing system may determine whether the stylus is oriented with its tip pointing toward an input surface of a capacitive touch sensor. As described above, the orientation of the stylus may be determined in any suitable way based on any suitable criteria using one or more processors, memory, and/or associated instructions and data within any portion of the processing system, including those which may be included within the stylus (e.g., stylus 126) and/or those which may be included within an electronic device that houses the capacitive touch sensor (e.g., electronic device 200). Further, the determination of the orientation of the stylus may also be based in part on a determined orientation of the input surface.

In step 904, based on the determined orientation of the stylus (e.g., that the stylus is oriented with its tip pointing toward an input surface of a capacitive touch sensor), the stylus transmits a first electrical signal through an exterior surface of a body of the stylus. As described above, this may be performed by a capacitive signal generator (e.g., capacitive signal generator 128) within the stylus.

In step 906. the processing system identifies a contact to a first area of an input surface of a capacitive touch sensor based on one or more changes in electrical charge sensed in the first area. As described above, this identification may be performed in any suitable way by a utility (e.g., touch screen utility 112) within an electronic device that houses the capacitive touch sensor (e.g., electronic device 200) or another computing device in communication with the electronic device that houses the capacitive touch sensor.

In step 908, the processing system determines that the one or more changes in electrical charge sensed in the first area include the first electrical signal. As described above, this determination may be performed in any suitable way by a utility (e.g., touch screen utility 112) within an electronic device that houses the capacitive touch sensor (e.g., electronic device 200) or another computing device in communication with the electronic device that houses the capacitive touch sensor.

In step 910, the processing system determines whether to identify the contact to the first area as spurious based at least in part on the determination that the one or more changes in electrical charge sensed in the first area include the first electrical signal. As described above, this determination may be performed in any suitable way by a utility (e.g., touch screen utility 112) within an electronic device that houses the capacitive touch sensor (e.g., electronic device 200) or another computing device in communication with the electronic device that houses the capacitive touch sensor.

Figure 10:
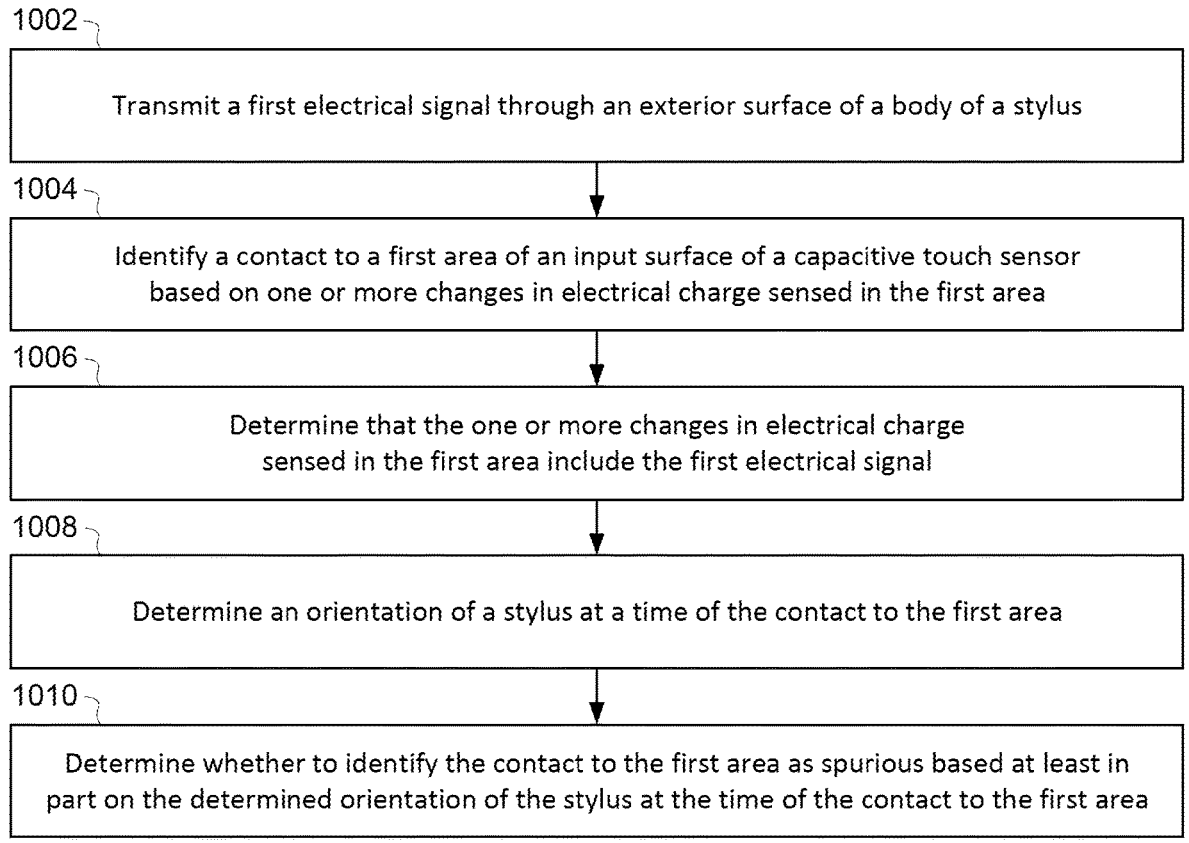
FIG. 10 depicts an exemplary method for determining whether to identify a contact as spurious, in accordance with aspects of the disclosure.

FIG. 10 depicts an exemplary method 1000 for determining whether to identify a contact as spurious, in accordance with aspects of the disclosure. In that regard, FIG. 10 sets forth another exemplary way that may be used by a processing system (e.g., a processing system 102 including an electronic device 200 and a stylus 126) to determine whether a contact by a user's hand (e.g., as may occur in the scenarios described above with respect to FIGS. 5A-8C) should be identified as spurious or intentional. In particular, FIG. 10 sets forth an exemplary method that may be employed where the stylus is configured to transmit a first electrical signal through its body regardless of its orientation.

Thus, in step 1002, the stylus transmits a first electrical signal through an exterior surface of a body of the stylus. As described above, this may be performed by a capacitive signal generator (e.g., capacitive signal generator 128) within the stylus.

In step 1004, the processing system identifies a contact to a first area of an input surface of a capacitive touch sensor based on one or more changes in electrical charge sensed in the first area. As described above, this identification may be performed in any suitable way by a utility (e.g., touch screen utility 112) within an electronic device that houses the capacitive touch sensor (e.g., electronic device 200) or another computing device in communication with the electronic device that houses the capacitive touch sensor.

In step 1006, the processing system determines that the one or more changes in electrical charge sensed in the first area include the first electrical signal. As described above, this determination may be performed in any suitable way by a utility (e.g., touch screen utility 112) within an electronic device that houses the capacitive touch sensor (e.g., electronic device 200) or another computing device in communication with the electronic device that houses the capacitive touch sensor.

In step 1008, the processing system determines an orientation of the stylus at a time of the contact to the first area. For example, the processing system may determine whether the stylus was oriented with its tip pointing toward an input surface of a capacitive touch sensor at any point in time when the contact was identified in the first area. Here as well, as described above, the orientation of the stylus may be determined in any suitable way based on any suitable criteria using one or more processors, memory, and/or associated instructions and data within any portion of the processing system, including those which may be included within the stylus (e.g., stylus 126) and/or those which may be included within an electronic device that houses the capacitive touch sensor (e.g., electronic device 200). Further, the determination of the orientation of the stylus may also be based in part on a determined orientation of the input surface.

Then, in step 1010, the processing system determines whether to identify the contact to the first area as spurious based at least in part on the orientation of the stylus at the time of the contact to the first area. As described above, the determination of whether to identify the contact to the first area as spurious may be performed in any suitable way by a utility (e.g., touch screen utility 112) within an electronic device that houses the capacitive touch sensor (e.g., electronic device 200) or another computing device in communication with the electronic device that houses the capacitive touch sensor. In addition, and as also described above, the orientation of the stylus may be determined in any suitable way based on any suitable criteria using one or more processors, memory, and/or associated instructions and data within any portion of the processing system, including those which may be included within the stylus (e.g., stylus 126) and/or those which may be included within an electronic device that houses the capacitive touch sensor (e.g., electronic device 200). Further, the determination of the orientation of the stylus may also be based in part on a determined orientation of the input surface.

FIG. 11 depicts an exemplary method 1100 for determining whether to identify a contact as spurious, in accordance with aspects of the disclosure. In that regard, FIG. 11 sets forth another exemplary way that may be used by a processing system (e.g., a processing system 102 including an electronic device 200 and a stylus 126) to determine whether a contact by a user's hand (e.g., as may occur in the scenarios described above with respect to FIGS. 5A-8C) should be identified as spurious or intentional. In particular, FIG. 11 sets forth an exemplary method that may be employed both with systems where the stylus is configured to transmit a first electrical signal through its body regardless of its orientation, and in systems where the stylus is configured to only transmit a first electrical signal through its body when its tip is pointing toward an input surface of a capacitive touch sensor.

Steps 1102-1106 are identical to steps 1002-1006 of FIG. 10, respectively, and thus are as described above.

In step 1108, the processing system determines whether to identify the contact to the first area as spurious based at least in part on the determination that the one or more changes in electrical charge sensed in the first area include the first electrical signal. As described above, this determination may be performed in any suitable way by a utility (e.g., touch screen utility 112) within an electronic device that houses the capacitive touch sensor (e.g., electronic device 200) or another computing device in communication with the electronic device that houses the capacitive touch sensor.

Figure 12:
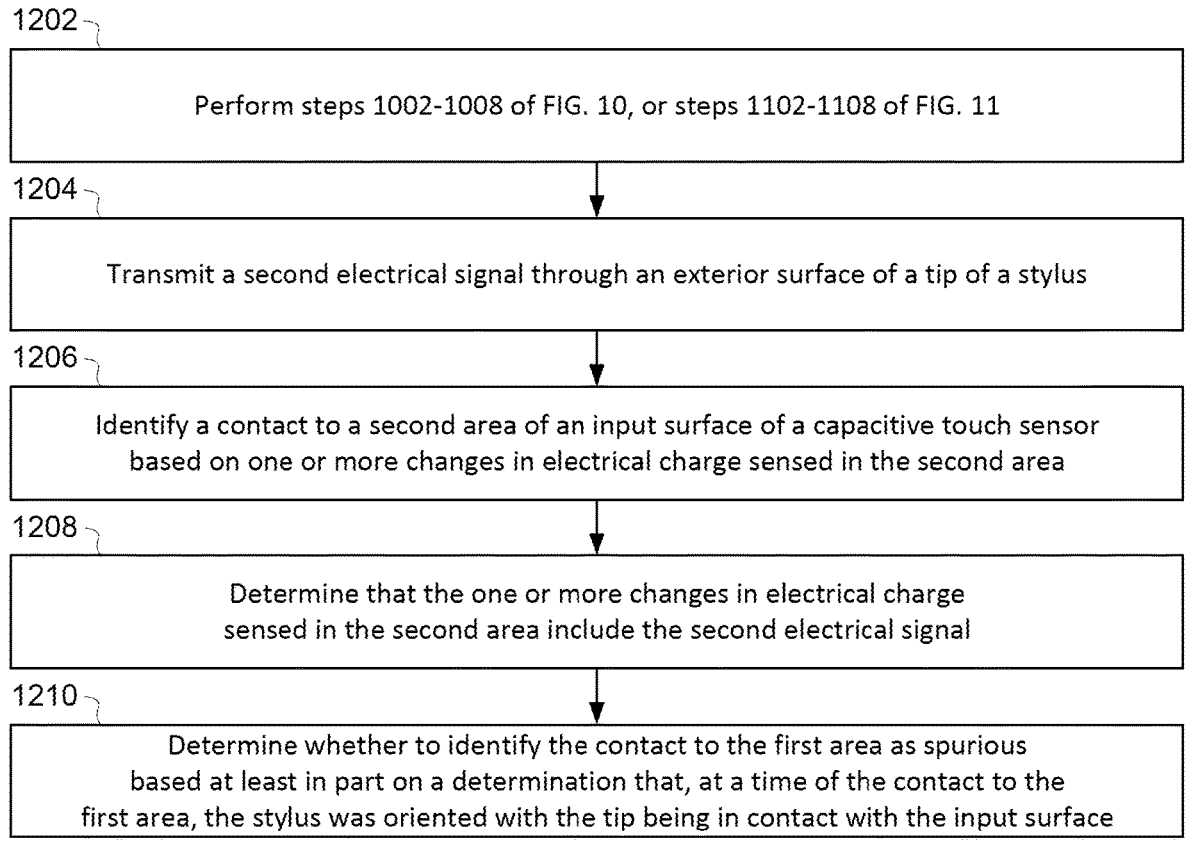
FIG. 12 depicts an exemplary method for determining whether to identify a contact as spurious, in accordance with aspects of the disclosure.

FIG. 12 depicts an exemplary method 1200 for determining whether to identify a contact as spurious, in accordance with aspects of the disclosure. In that regard, FIG. 12 sets forth additional steps that may be performed by a processing system (e.g., a processing system 102 including an electronic device 200 and a stylus 126) in addition to the steps of method 1000 or method 1100 in order to determine whether a contact by a user's hand (e.g., as may occur in the scenarios described above with respect to FIGS. 5A-8C) should be identified as spurious or intentional. In particular, FIG. 12 sets forth an exemplary method for transmitting a second electrical signal through the tip of the stylus, and detecting the second signal in a second area of the input surface.

Thus, as shown in step 1202, it is assumed that the processing system will perform either steps 1002-1010 of FIG. 10, or steps 1102-1108 of FIG. 11. Although FIG. 12 depicts step 1202 as coming before steps 1204-1210, it will be understood that steps 1002-1008 of FIG. 10 or steps 1102-1108 of FIG. 11 may be performed in any suitable order relative to steps 1204-1210 of FIG. 12, including simultaneously with steps 1204-1210 of FIG. 12.

In step 1204, the stylus transmits a second electrical signal through an exterior surface of a tip of the stylus. As described above, this may be performed by a capacitive signal generator (e.g., capacitive signal generator 128) within the stylus.

In step 1206, the processing system identifies a contact to a second area of an input surface of a capacitive touch sensor based on one or more changes in electrical charge sensed in the second area. As described above, this identification may be performed in any suitable way by a utility (e.g., touch screen utility 112) within an electronic device that houses the capacitive touch sensor (e.g., electronic device 200) or another computing device in communication with the electronic device that houses the capacitive touch sensor.

In step 1208, the processing system determines that the one or more changes in electrical charge sensed in the second area include the second electrical signal. As described above, this determination may be performed in any suitable way by a utility (e.g., touch screen utility 112) within an electronic device that houses the capacitive touch sensor (e.g., electronic device 200) or another computing device in communication with the electronic device that houses the capacitive touch sensor.

Then, in step 1210, the processing system determines whether to identify the contact to the first area as spurious based at least in part on a determination that, at a time of the contact to the first area, the stylus was oriented with the tip being in contact with the input surface. Where FIG. 10 is combined with FIG. 12, it will be understood that the determinations of step 1008 and step 1210 of FIG. 12 may represent a signal determination. Likewise, where FIG. 11 is combined with FIG. 12, it will be understood that the determinations of step 1108 and step 1210 of FIG. 12 may represent a signal determination.

As described above, the determination in step 1210 of whether to identify the contact to the first area as spurious may be performed in any suitable way by a utility (e.g., touch screen utility 112) within an electronic device that houses the capacitive touch sensor (e.g., electronic device 200) or another computing device in communication with the electronic device that houses the capacitive touch sensor.

In addition, and as also described above, the determination that the stylus was oriented with its tip being in contact with the input surface at a time of the contact to the first area may be made in any suitable way based on any suitable criteria using one or more processors, memory, and/or associated instructions and data within any portion of the processing system, including those which may be included within the stylus (e.g., stylus 126) and/or those which may be included within an electronic device that houses the capacitive touch sensor (e.g., electronic device 200). For example, this determination may be based on the determination made by the processing system in step 1208 that the one or more changes in electrical charge sensed in the second area include the second electrical signal.

Further, as described above in a technical solution presented with respect to FIGS. 5A-5C, in some aspects of the technology the processing system may be configured to determine that the stylus was oriented with its tip being in contact with the input surface while a user's hand was in contact with the first area even during a period of time in which the tip was not constantly in contact with the input surface.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A system comprising:
a capacitive touch sensor having an input surface;
a stylus having a tip at a first end, a body extending from the tip to a second end, and a longitudinal axis extending from the first end to the second end, the stylus being configured to transmit a first electrical signal through an exterior surface of the body based at least in part on a determination of an orientation of the stylus;
a memory; and
one or more processors coupled to the memory and configured to:
identify a contact to a first area of the input surface based on one or more changes in electrical charge sensed in the first area;
determine that the one or more changes in electrical charge sensed in the first area include the first electrical signal; and
determine whether to identify the contact to the first area as spurious based at least in part on the determination that the one or more changes in electrical charge sensed in the first area include the first electrical signal.

2. The system of claim 1, wherein the capacitive touch sensor is part of a capacitive touch screen.

3. The system of claim 1, wherein the one or more processors are further configured to determine that the one or more changes in electrical charge sensed in the first area include the first electrical signal based at least in part on one or more of a frequency of the changes in electrical charge, a phase of the changes in electrical charge, or an amplitude of the changes in electrical charge.

4. The system of claim 1, wherein the stylus is further configured to transmit the first electrical signal through an exterior surface of the body based on a determination that the tip of the stylus is pointing toward the input surface of the capacitive touch sensor.

5. The system of claim 1, wherein the stylus is further configured not to transmit the first electrical signal through an exterior surface of the body based on a determination that the stylus is oriented with the longitudinal axis substantially parallel to the input surface.

6. The system of claim 1, wherein the stylus is further configured not to transmit the first electrical signal through an exterior surface of the body based on a determination that the stylus is oriented with the tip pointing away from the input surface.

7. The system of claim 1, wherein the stylus is further configured to transmit a second electrical signal through an exterior surface of the tip.

8. The system of claim 7, wherein the one or more processors are further configured to:
identify a contact to a second area of the input surface based on one or more changes in electrical charge sensed in the second area; and
determine that the one or more changes in electrical charge sensed in the second area include the second electrical signal.

9. The system of claim 1, wherein the stylus is further configured to determine an orientation of the stylus based at least in part on an output of one or more of a tilt sensor, a gyro sensor, an accelerometer, or a camera included in the stylus.

10. A computer-implemented method, comprising:
determining, using one or more processors of a processing system, an orientation of a stylus, the stylus having a tip at a first end, a body extending from the tip to a second end, and a longitudinal axis extending from the first end to the second end;
transmitting a first electrical signal through an exterior surface of a body of the stylus based on the determined orientation of the stylus;
identifying, using the one or more processors, a contact to a first area of an input surface of a capacitive touch sensor based on one or more changes in electrical charge sensed in the first area;
determining, using the one or more processors, that the one or more changes in electrical charge sensed in the first area include the first electrical signal; and
determining, using the one or more processors, whether to identify the contact to the first area as spurious based at least in part on the determination that the one or more changes in electrical charge sensed in the first area include the first electrical signal.

11. The method of claim 10, wherein determining that the one or more changes in electrical charge sensed in the first area include the first electrical signal is based at least in part on one or more of a frequency of the changes in electrical charge, a phase of the changes in electrical charge, or an amplitude of the changes in electrical charge.

12. The method of claim 10, wherein transmitting a first electrical signal through an exterior surface of a body of the stylus based on the determined orientation of the stylus comprises transmitting the first electrical signal through an exterior surface of the body based on a determination that the tip of the stylus is pointing toward the input surface of the capacitive touch sensor.

13. The method of claim 10, wherein transmitting a first electrical signal through an exterior surface of a body of the stylus based on the determined orientation of the stylus comprises not transmitting the first electrical signal through an exterior surface of the body based on a determination that the stylus is oriented with the longitudinal axis substantially parallel to the input surface.

14. The method of claim 10, wherein transmitting a first electrical signal through an exterior surface of a body of the stylus based on the determined orientation of the stylus comprises not transmitting the first electrical signal through an exterior surface of the body based on a determination that the stylus is oriented with the tip pointing away from the input surface.

15. The method of claim 10, further comprising transmitting a second electrical signal through an exterior surface of the tip.

16. The method of claim 15, further comprising:
identifying, using the one or more processors, a contact to a second area of the input surface based on one or more changes in electrical charge sensed in the second area; and
determining, using the one or more processors, that the one or more changes in electrical charge sensed in the second area include the second electrical signal.

17. The method of claim 10, wherein determining the orientation of the stylus is based at least in part on an output of one or more of a tilt sensor, a gyro sensor, an accelerometer, or a camera included in the stylus.

18. A non-transitory computer readable medium having instructions stored thereon, the instructions, when executed by one or more processors of a processing system, implementing a method comprising:
determining an orientation of a stylus, the stylus having a tip at a first end, a body extending from the tip to a second end, and a longitudinal axis extending from the first end to the second end;

transmitting a first electrical signal through an exterior surface of a body of the stylus based on the determined orientation of the stylus;

identifying a contact to a first area of an input surface of a capacitive touch sensor based on one or more changes in electrical charge sensed in the first area;

determining that the one or more changes in electrical charge sensed in the first area include the first electrical signal; and determining whether to identify the contact to the first area as spurious based at least in part on the determination that the one or more changes in electrical charge sensed in the first area include the first electrical signal.

19. The non-transitory computer readable medium of claim 18, wherein determining that the one or more changes in electrical charge sensed in the first area include the first electrical signal is based at least in part on one or more of a frequency of the changes in electrical charge, a phase of the changes in electrical charge, or an amplitude of the changes in electrical charge.

20. The non-transitory computer readable medium of claim 18, wherein transmitting the first electrical signal through the exterior surface of a body of the stylus based on the determined orientation of the stylus comprises:

transmitting the first electrical signal through the exterior surface of the body based on a determination that the tip of the stylus is pointing toward the input surface of the capacitive touch sensor;

not transmitting the first electrical signal through the exterior surface of the body based on a determination that the stylus is oriented with the longitudinal axis substantially parallel to the input surface; or not transmitting the first electrical signal through the exterior surface of the body based on a determination that the stylus is oriented with the tip pointing away from the input surface.

\* \* \* \* \*